UNITED STATES PATENT OFFICE.

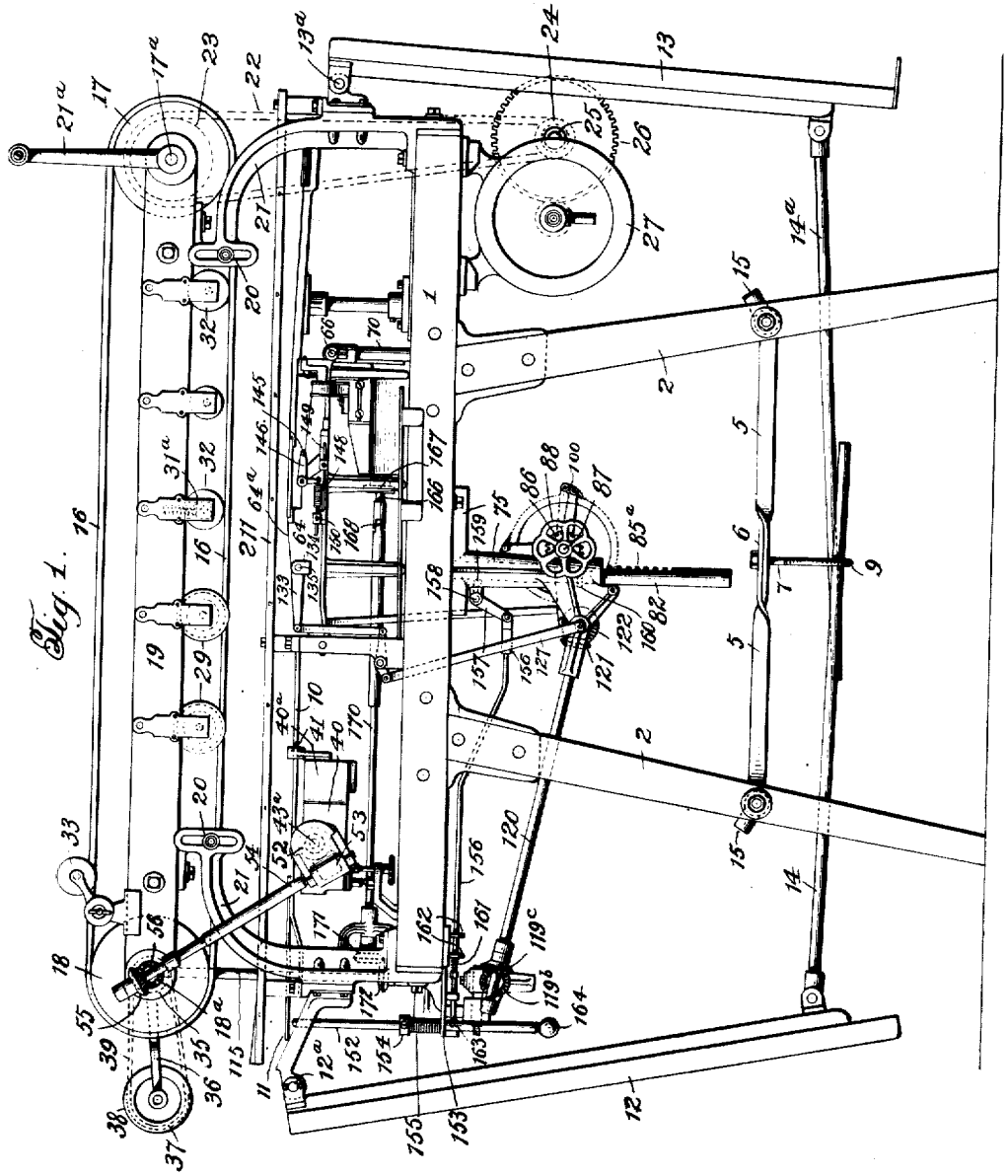

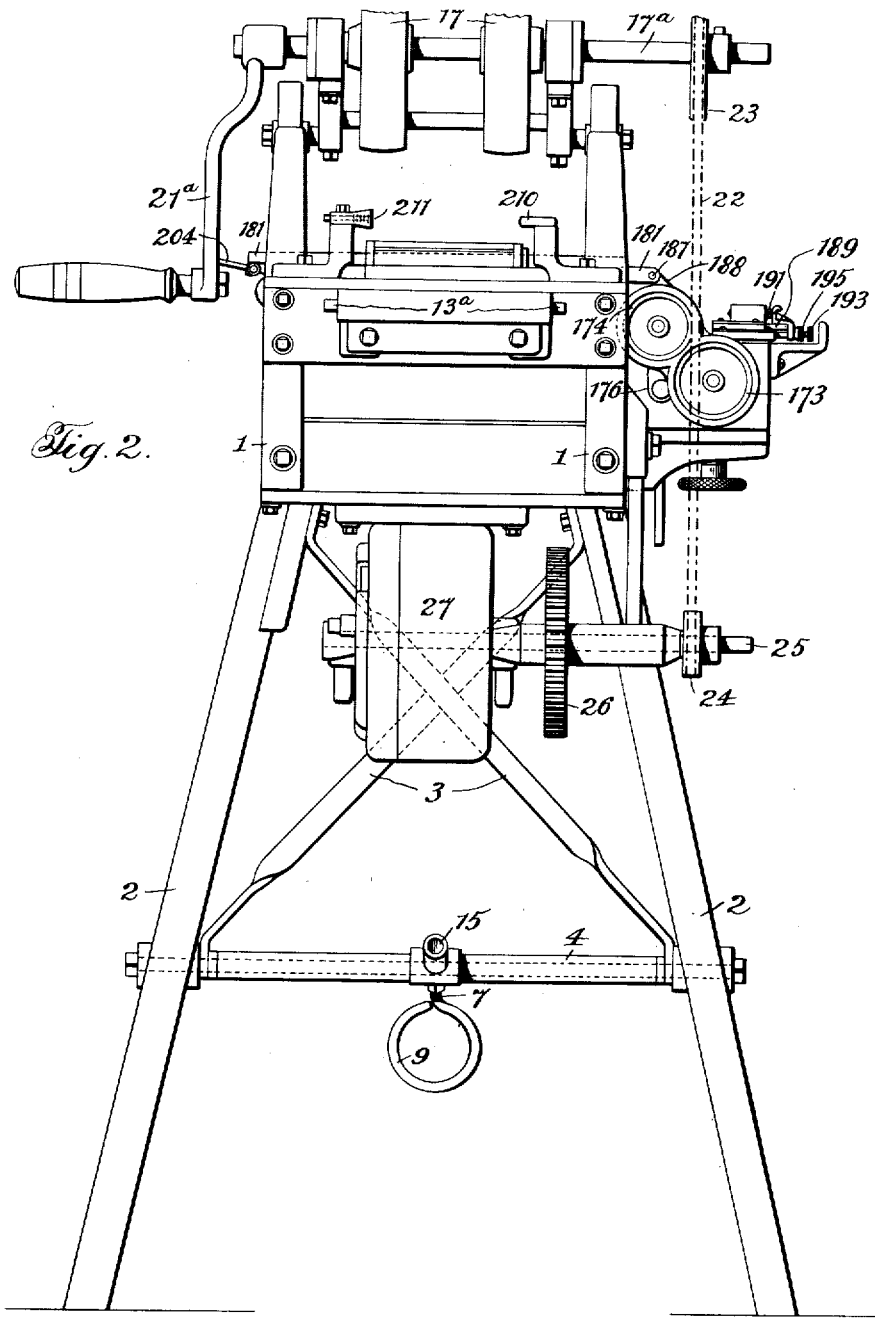

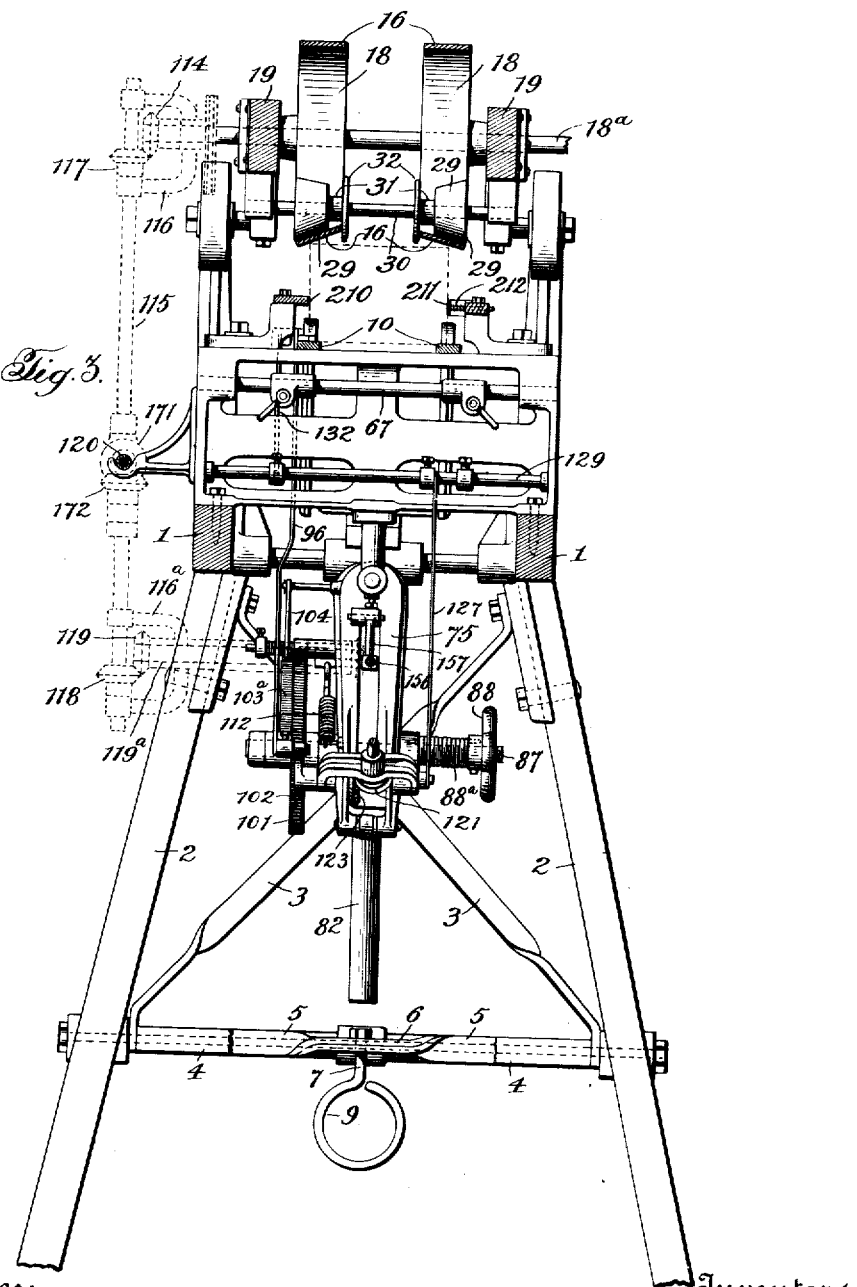

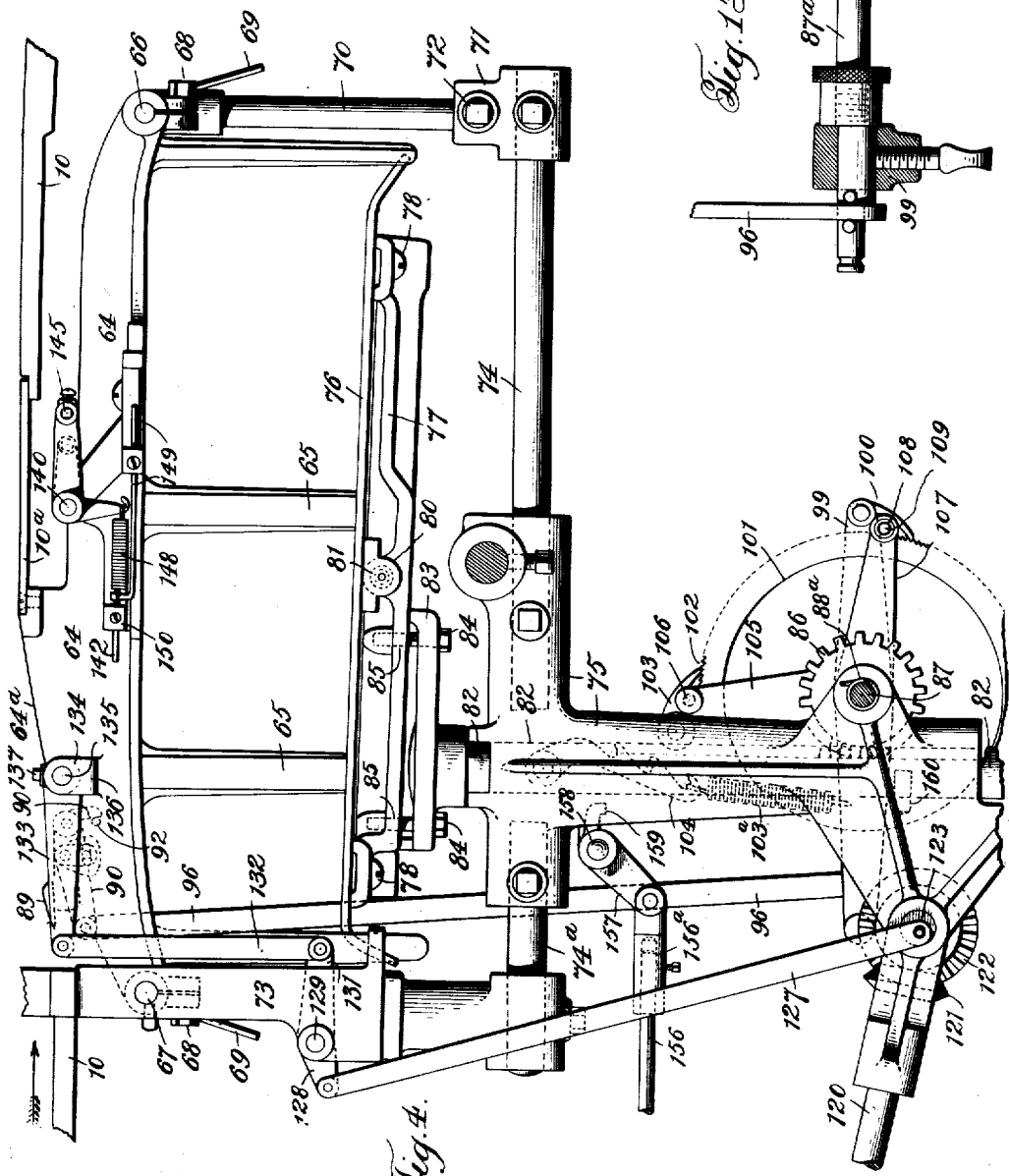

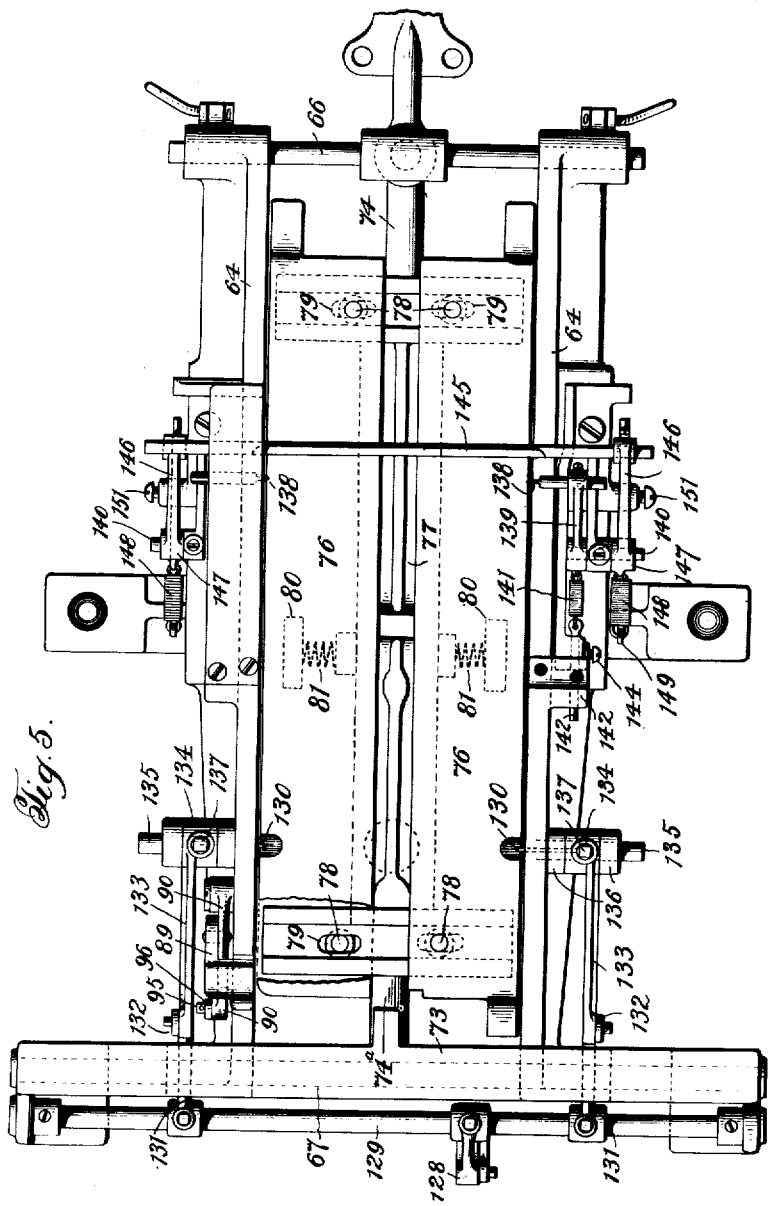

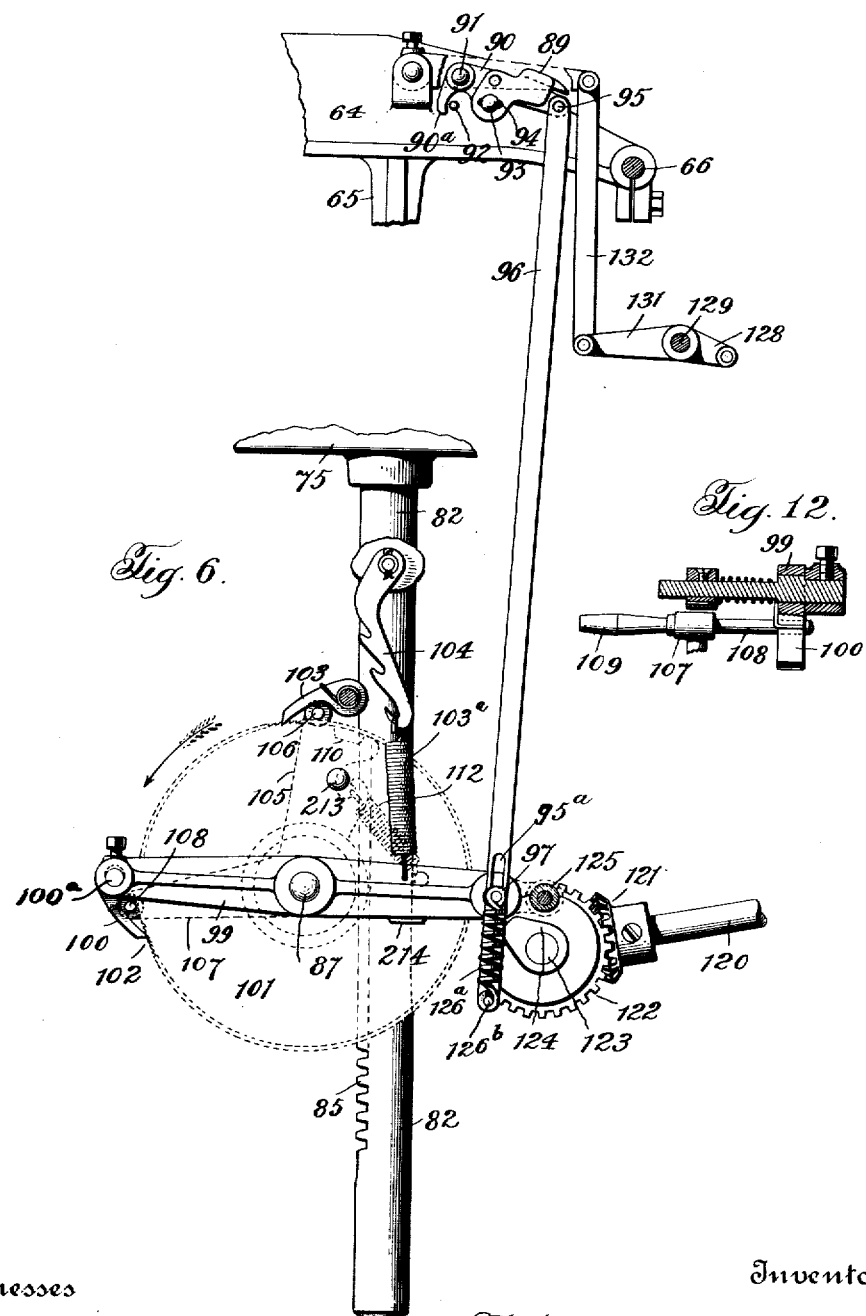

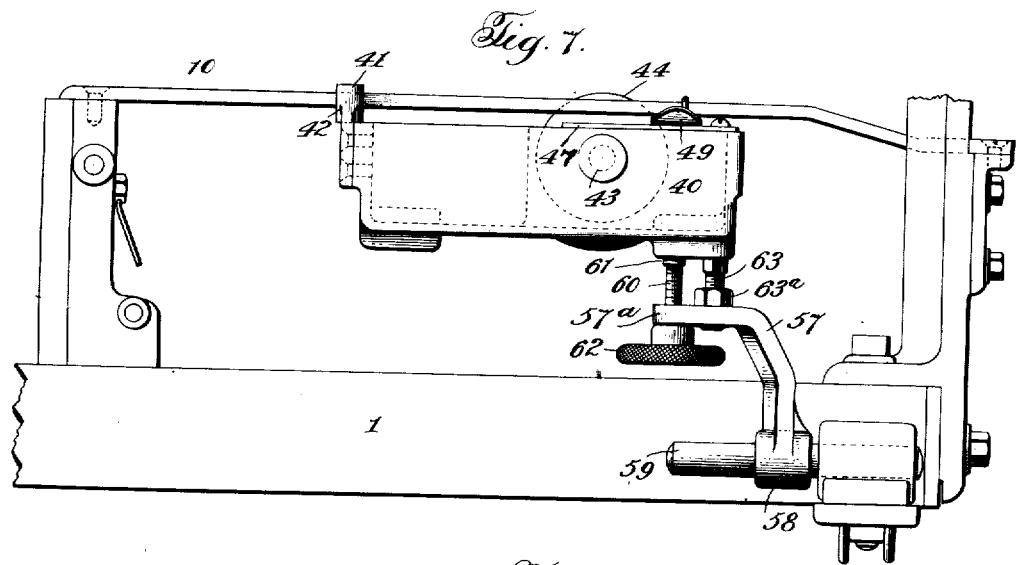
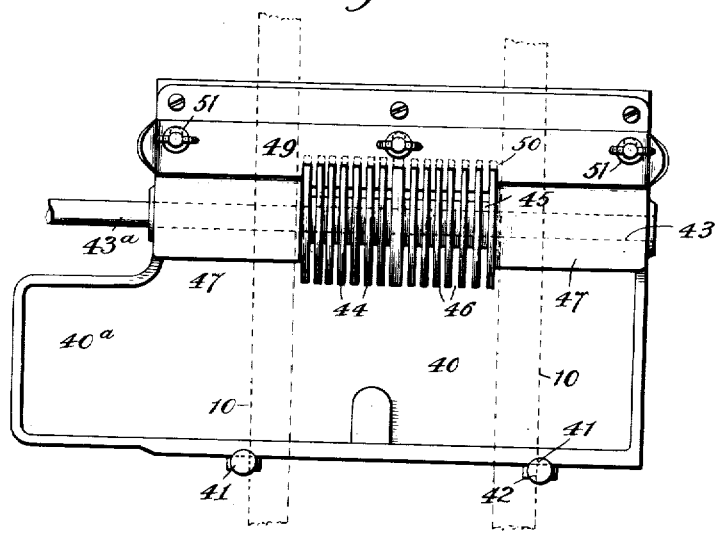

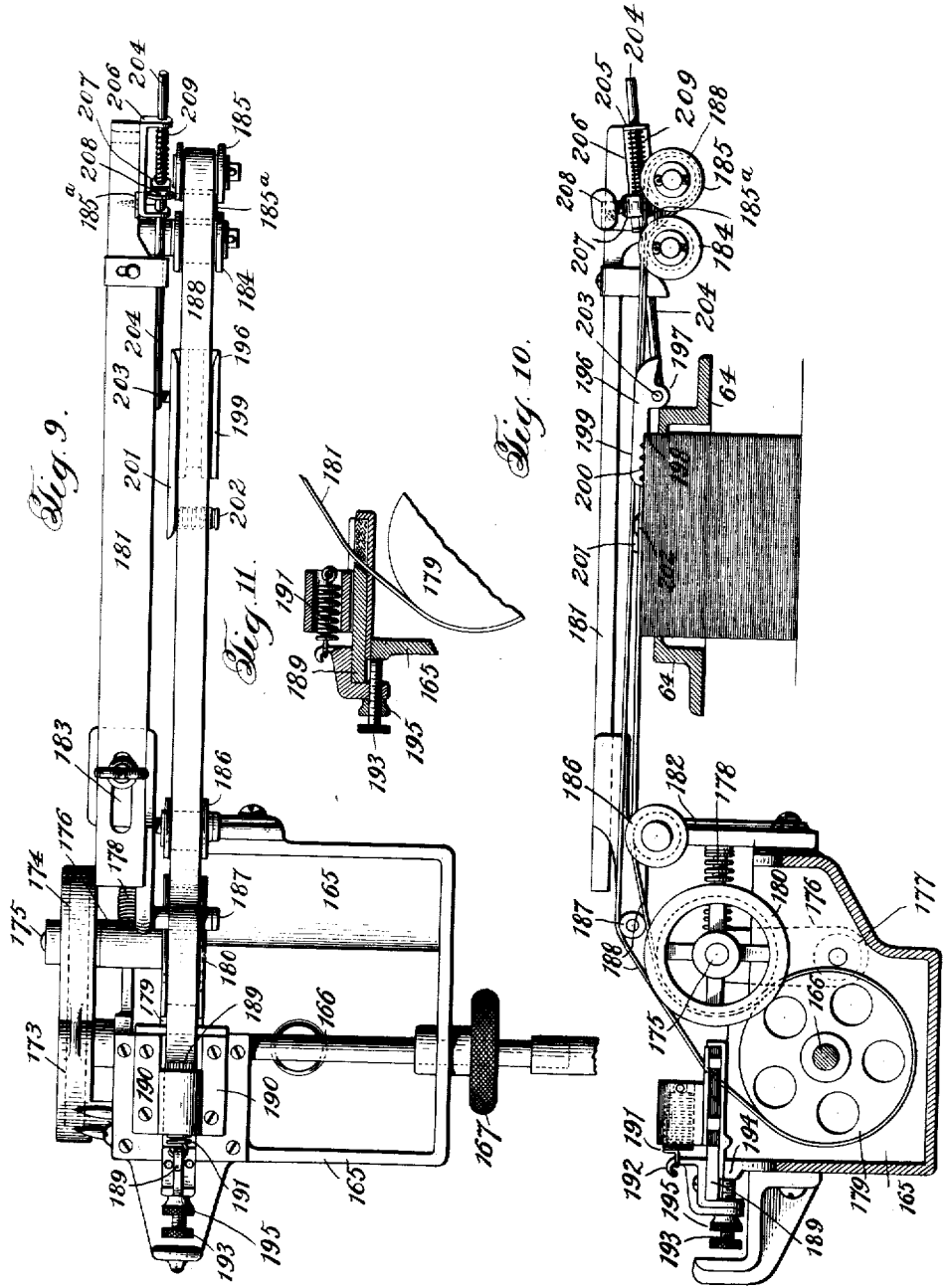

FREDERICK H. KNAPP, OF ROLAND PARK, AND HAYWOOD G. DEWEY, OF WESTMINSTER, MARYLAND, ASSIGNORS TO FRED. H. KNAPP COMPANY, OF WESTMINSTER, MARYLAND, A CORPORATION OF MARYLAND.

LABELING-MACHINE.

1,271,724.     Specification of Letters Patent.     Patented July 9, 1918.

Application filed February 5, 1915. Serial No. 6,314.

*To all whom it may concern:*

Be it known that we, FREDERICK H. KNAPP and HAYWOOD G. DEWEY, citizens of the United States, residing at Roland Park, county of Baltimore, State of Maryland, and Westminster, county of Carroll, State of Maryland, respectively, have invented certain new and useful Improvements in Labeling-Machines, of which the following is a specification, reference being had therein to the accompanying drawing.

This invention relates to labeling machines and more particularly to machines for labeling cans, boxes or other packages.

In machines of this character it is quite common to employ a can runway along which the cans are adapted to roll and have paste applied thereto, whereby a label is picked up and wound around the same, the lap end of the label having been pasted and being secured in place in the continued movement of the cans. It is this type of apparatus with which the present invention has more particularly to deal, comprehending as it does a structure in which the various parts are improved upon and the machine, as a whole, rendered more efficient, durable and satisfactory in use.

One of the objects of the invention is to provide novel and improved means for applying paste to the can for label pick up purposes whereby to prevent the accumulation of dirt, paste, etc., upon the surface of the paste applying member, and with a view to overcoming to a large extent wrinkling of the labels due to a wetting thereof, from edge to edge, as by the pasting means usually employed for this purpose.

A further object of the invention is to provide novel means for applying paste to the lap end of the label, and to guard the edge of the labels against an application of paste as the paste applying member moves into contact with the upper surface of the labels.

Another feature of the invention resides in the provision of novel means whereby to feed the cans along the runway, said means being of a character whereby it is protected from an application of paste from the pasted cans at certain points in the feeding movement of the cans.

It is also contemplated by the present invention to provide a novel construction and arrangement of label receptacle, and improved means whereby the receptacle and label follower are adapted for labels of different sizes.

Further, the invention embraces novel means for feeding the label bed into position whereby the topmost labels will be picked up by the traveling cans, said means being positively actuated at suitable intervals determined by the height of the label supply. In connection with the actuating means for the label bed while being controlled by the moving cans, it will be understood that the preferred construction and arrangement of parts are such that the label bed will not be raised each time a label is picked up by a passing can, but only as conditions warrant such elevation.

The novel construction of label feed is of especial importance in connection with the labeling of fragile cans or packages, in that while can pressure means is employed as a controlling factor for the label bed elevating means, this pressure to accomplish all necessary functions may be exceedingly light thereby overcoming any likelihood of crushing or otherwise injuring the packages.

It is further contemplated by the invention to provide retaining means to engage the uppermost labels, said means being adapted to be positively moved by a driven part of the machine whereby to release the uppermost labels, as desired. Preferably this latter feature of invention embodies knife blades to engage the uppermost label, said blades being mounted upon movable supports, which latter are adapted to be positively actuated by a driven part of the machine to impart a cutting action to the knives whereby to readily cut through the uppermost label and release the same, when desired.

Still further, the invention includes a novel construction and arrangement of can stop adapted, as the supply of labels becomes or is about to become exhausted, to automatically move into the path of the cans and interrupt the movement thereof.

Finally, the invention includes many minor improvements and novel details in the construction and arrangement of the various parts of the apparatus which will be appreciated from the description to follow, when considered in connection with the accompanying drawings, which form a part hereof, and wherein is disclosed, for the purpose of illustration, convenient and satisfactory embodiments of the invention, though it is to be understood in this connection that many minor changes may be made without deviating from the spirit of the invention.

In the drawings:—

Figure 1 is a front elevation of our improved labeling machine;

Fig. 2 is an end elevation of the same;

Fig. 3 is a cross sectional view;

Fig. 4 is an elevation, partly in section, on an enlarged scale, of the label holder and its associated parts;

Fig. 5 is a top plan view of the same;

Fig. 6 is an elevation of the ratchet feed;

Figs. 7 and 8 are enlarged detail views of the can pick-up pasting mechanism;

Fig. 9 is an enlarged plan view of the lap end pasting mechanism;

Fig. 10 is a side elevation of the same, with the paste pot shown in section;

Fig. 11 is a cross sectional view;

Fig. 12 is a detail view, and

Fig. 13 is a detail view.

With more particular reference to the drawings wherein like reference numerals refer to corresponding parts throughout the several views, 1 is a main frame of any suitable construction, and preferably of metallic rectangular formation, the said frame being supported from suitable standards or legs 2, which are arranged in pairs, with the legs of each pair connected to one another as by diagonally extending overlapping braces 3, and a cross brace 4. Projecting between the cross braces 4 are longitudinally extending braces 5, which said braces extend from a point adjacent one end of one of the cross braces 4 to a point adjacent the opposite end of the other cross brace 4, whereby the respective brace members 5 overlap substantially centrally of the machine.

The brace members 5, at their overlapping portions are flattened, as at 6, whereby to strengthen the bars and to afford a smooth contact one with the other. A bolt 7 serves to connect the bars 5, said bolt being threaded and adapted to be engaged by suitable retaining nuts 8 and 8'. The bolt 7 at its lower end terminates in an eye-portion 9, adapted for a purpose to be presently described.

A runway for cans or the like extends longitudinally of the machine, the runway being generally indicated by the numeral 10, and comprising oppositely disposed bars adapted to afford a supporting rest for the cans adjacent the ends of the latter. The runway bars adjacent the can inlet end of the machine connect with spring bars 11, whereby to protect the cans against crushing, etc., in the feeding operation. Adjacent opposite ends of the machine are suitable chutes, the forward one, 12, forming a feed chute and the other, 13, a discharge chute. These chutes are pivotally mounted at their inner ends, as indicated at $12^a$ and $13^a$ respectively, and adjacent their free outer ends have pivotally connected thereto a supporting rod 14, and $14^a$ respectively, which said rods, when the chutes are lowered are adapted to engage within the eye 9 of the bolt 7, and are thereby supported against contact with the floor, etc.

It will be observed that the chutes 12 and 13 are of a length so that when in lowered position they will not contact with the floor or other surface. When the machine is in use, it will be understood, of course, that the chutes are in elevated position, and in order to firmly support the same in this position, the supporting bars 14 and $14^a$ are adapted to loosely engage within suitable recessed bosses 15, upon the cross bars 4.

The feeding mechanism preferably includes endless belt carriers 16, mounted upon rollers 17 and 18 respectively, positioned upon shafts $17^a$ and $18^a$ respectively. The shafts $17^a$ and $18^a$ are supported upon a suitable auxiliary frame 19, extending longitudinally of and above the runway, the auxiliary frame being vertically adjustable as through the medium of the pin and slot engagement 20 with the overhang brackets 21 projecting upwardly from the main supporting frame 1 adjacent opposite ends of the latter. The rollers 17 are fixed to the shaft $17^a$ and constitute the driving wheels for the belt 16, the same being adapted to be actuated either manually as by the hand crank $21^a$ or mechanically through the medium of a chain 22, adapted to engage a sprocket wheel 23, fixed to the shaft $17^a$ and a sprocket wheel 24 fixed to the shaft 25, which latter has a gear connection 26 of any desired construction, with a suitable electric motor or the like 27.

In order to prevent contacting of the belt 16 with the pasted portion of the cans, suitable guide rollers of special formation are provided, to engage the inner surface of the lower stretch of the belts. These rollers are clearly illustrated at 29, in Fig. 3, and have a conical periphery with the smaller end thereof innermost. The rollers 29 are mounted upon a suitable shaft 30, and each has a hub portion 31, connecting with a disk-part 32, of substantially the same diameter as the greatest diameter of the roller 29, thereby affording an abutment to prevent slipping of the belt while permitting the belt to slightly yield in the space between the disk and smaller end of the roller. The shafts 30, for the rollers 29, are positioned in spring pressed supports $31^a$, the tendency of which latter is to position the roller supported belts 16 in driving contact with the edges or ends of the cans in their movement along the runway with the result that the belts will not engage the pasted area of the periphery of the cans until after the application of the label thereto. At suitable intervals throughout the length of the feed belts 16 are suitable spring pressed rollers 32, of substantially the same diameter from end to end, adapted to exert feeding pressure of the belt on the cans throughout the length of the latter. A belt tightener of any approved type 33 may be provided to take up any necessary play.

The roller 18 is fixedly mounted upon the shaft 18ᵃ. Also fixed to said shaft is a suitable sprocket wheel 35. A swinging bracket or support 36 is sleeved upon the shaft 18ᵃ and supports at its free end a loosely mounted sprocket wheel 37, which said sprocket wheel is connected to a suitable spacing roller 38, adapted to engage the cans as they approach the entrance end of the runway 10. A sprocket chain 39 is mounted upon the sprocket wheels 35 and 37, respectively, to impart driving movement to the spacing roller 38. The spacing roller 38 will, of course, by reason of its driving connection, impart to the cans a reduced feeding movement, as compared with that imparted to the cans by the belt 16, to the end that the cans will be properly spaced in their movement along the runway to the various labeling instrumentalities.

The can pick-up pasting mechanism is arranged at the forward end of the machine below the runway and includes a paste receptacle 40, having a lateral projection 40ᵃ adjacent the rear end extending beyond one side of the runway, in order that a quantity of paste may be readily inserted into the receptacle from the side of the machine. At the rear end of the receptacle 40 there are provided suitable supporting brackets 41, which latter have therein a transverse slot 42, adapted to engage over opposite edges and top of a support such as the runway bars. The engagement between the brackets 41 and the runway bars is a relatively loose one permitting of a longitudinal movement as well as a slight tilting of the opposite end of the receptacle about the fulcrum provided by the contact between the brackets 41 and the runway bars. Adjacent the forward end of the paste receptacle 40 is a suitable supporting shaft 43, extending transversely of the runway and adapted to have mounted thereon a pasting roller, which latter comprises a plurality of connected disk-shaped parts 44, fixed upon a common hub 45, secured to the shaft 43, the disk-shaped parts 44 being separated from one another by an intervening space 46.

It has been found in practice that a solid roll construction adapted to apply paste to the can from end to end thereof for label pick-up purposes is apt to accumulate on its periphery, paste, dust, etc., and the present construction of paste pick-up roller is of a character to overcome this and other objections, as well as, for instance, soaking of the labels and subsequent wrinkling of the same.

A hood or cover 47 is provided at the forward end of the receptacle 40, the same having a suitable cut out part whereby to receive the paste roller, the overlying sides of the hood forming scraping means for the ends of the roller, to prevent any accumulation of the paste at this point. A suitable scraper member 49 is positioned upon the cover 47, and has a series of fingers 50, adapted to engage in the spaces 46 between the disk-members 44 of the roller, thereby preventing unnecessary accumulation upon the periphery of the disk members 44.

The scraping member 49 is adjustably mounted as through the medium of the pin and slot connection 51, with the cover 47, to the end that the quantity of paste taken up by the periphery of the disks 44 and delivered to the cans may be accurately regulated as desired. The shaft 43 for the paste roller just described has an extension 43ᵃ, projecting outwardly into the space forwardly of the lateral extension of the receptacle 40, and is adapted to be driven as through the medium of a worm-gear 52, adapted to be engaged by a worm 53, at the lower end of a shaft 54, carrying at its upper end a gear 55, adapted to be driven by a suitable gear 56, mounted on the shaft 18ᵃ.

The forward end of the paste receptacle 40 which accommodates the pasting roll is mounted upon a suitable bracket 57, adjustably mounted at 58, upon a suitable supporting member 59, to the end that the paste receptacle may be adjusted longitudinally of the machine. 60 is a bolt having a threaded engagement with the offset part 57ᵃ of the bracket 57, and a suitable engagement 61, with the base of the receptacle 40, said bolt 60 terminating in a hand engaging part 62, to the end that the forward end of the receptacle may be slightly tilted about the fulcrum provided by the supporting brackets 41, to thereby regulate the engagement between the paste disks 44, with the periphery of the cans. A suitable centering device and auxiliary support for the receptacle includes a bolt 63, having a tapered upper end loosely engaging in a recess in the base of the receptacle 40, and having a threaded engagement at its opposite end in an aperture in the offset part 57ᵃ of the bracket. A nut 63ᵃ serves to retain the bolt 63 in position, after having been adjusted to accommodate for the adjustment of the bolt 60.

The label receptacle and label feeding mechanism is positioned to the rear of the paste receptacle 40, and will now be described.

The label receptacle includes suitable sides 64, the upper edges of which taper downwardly at their forward ends 64ᵃ to a point below the runway bars 10 to the end that the forward ends of the uppermost labels will be positioned above the forward end of the label receptacle whereby to be picked up by a passing can in its movement along the runway and over the upper edges 64ᵃ of the label receptacle, which said upper edges constitute in effect a continuation of the run-way bars 10. The said upper edges of the sides 65 connect with that portion of the runway bars 10ᵃ projecting rearwardly beyond the label receptacle. Projecting downwardly from the sides 64 of the label receptacle are vertical bars 65, which form guides for the sides of the label support proper, as well as guides for the edges of the labels positioned upon the label support. In order to accommodate for labels of variable widths, the sides 64 are relatively laterally adjustable, the sides 64 having a sleeved engagement at their ends with suitable rods 66 and 67, respectively, retaining means of any desired construction such as threaded bolts 68 being provided to engage a slitted portion of said sleeve connection, whereby to clamp the latter in position. The bolts 68 conveniently have a hand engaging part 69. The rod 66 has connection with a vertical rod 70, which latter engages within a suitable bracket sleeve 71, the rod 70 being vertically adjustable and adapted to be held in adjusted position as by a threaded bolt 72.

The rod 67 at the opposite end of the label receptacle is supported in any desired manner upon a suitable frame 73. The supporting frame 73 and supporting bracket 71 are mounted upon longitudinally extending rods 74 and 74ᵃ projecting into a T-shaped sleeve support 75, the latter being mounted in any desired manner upon the frame 1. The label follower or bed proper comprises plates 76 mounted upon a suitable base 77, as by threaded bolts 78, projecting downwardly from the plates 76 and engaging slotted apertures 79 in said base 77. Suitable lugs 80 project downwardly from the undersurface of the plates 76, and spiral springs 81 engage at one end a fixed part of the support 77, and at the opposite end said bosses 80, whereby to force the plates 76 outwardly into contact with the vertical guides 65, thereby adapting the plates 76 to the size of the receptacle determined by the adjustable sides 64. The support proper for the label follower includes an elongated cylindrical rod extension 82, having at its upper end an offset bracket 83, to which the support 77 is mounted, as through the medium of threaded bolts 84, engaging in recesses 85, in said support 77. Through the medium of the bolts 84 it will be appreciated that the pick-up end of the labels positioned in the receptacle may be elevated or lowered relative to the opposite end thereof, as desired, so as to properly position this end of the labels in the path of the rolling can. The rod 82 has upon one edge thereof rack teeth 85ᵃ, adapted to be engaged by suitable gear teeth 86, mounted upon a shaft 87, supported at the lower end of the T-shaped member 75. The gear teeth 86 are adapted to be moved as by a hand wheel 88, but are preferably intermittently moved through the medium of mechanism, positively driven by suitable means controlled by the movement of a can passing along the runway, said mechanism acting, however, to raise the rod 82 only at separated intervals to replenish the supply of labels, substantially as follows:—

The feeding mechanism for the labels includes a can presser member or trip arm 89 connected to a rock arm 90, sleeved upon a suitable stud 91. The rock arm 90 has a curved tail piece 90ᵃ to engage a lug 92 on one of the sides 64 of the label receptacle so as to limit the upward swinging movement of the rock arm 90. The connection between the trip member 89 and rock arm 90 is adjustable, as through the medium of a pin and slot connection 93, 94, with the arm 90 whereby the position of the trip member 89 may be accurately adjusted with respect to the desired height to which labels are to be fed.

It will be noted that the can presser member 89 is arranged upon the side of the label receptacle adjacent the forward upper edge thereof, whereby the movable end thereof to be engaged by the cans is positioned in the space above the inclined portion 64ᵃ of the label receptacle. The downward movement of the presser member by the can is determined by the height of the labels in the receptacle,—that is to say,— assuming that the normal position of the can engaging end of the presser member is in substantially the same horizontal plane as the topmost label, the can in its movement over the label supply will not, owing to its contact with the label supply, move the presser member to any appreciable extent, but as a number of labels are taken up, the lowering movement of the presser member by the cans is increased and only after said presser member is moved downwardly by the cans a predetermined distance is the actuating means operative to elevate the label bed.

Operatively connected, as by a pintle 95, to the free end of the rock arm 90, is a vertically extending bar 96, which latter is slotted at its lower end at 95ᵃ, whereby to receive a pintle 97 on the rock arm 99, sleeved upon the shaft 87. The pintle 97 has an eccentric extension mounted in a bearing in the rock arm 99, and terminates in a hand engaging part 87ᵃ whereby the pintle may be adjusted by rotating the hand engaging part 87ᵃ, and in this way, the engagement between the pintle and the wall surrounding the slotted portion 95ᵃ of the bar 96 may be adjusted. At the free end of the rock arm 99 is positioned a spring actuated pawl 100, adapted to engage suitable ratchet teeth 102, upon a ratchet wheel 101 secured to the shaft 87. The pivot bearing 100ᵃ for the pawl 100 is in the form of an adjustable eccentric to the end that the feeding relation of the respective pawls 100 and 103 with respect to the ratchet wheel may be adjusted and accurately set to compensate for wear or any inaccuracy in construction. The pawl or dog 100 constitues an actuating means for the wheel 101, and means for holding the wheel in adjusted positions is provided by a spring held dog 103.

Assuming that the height of the label supply is such that the can will not force the presser member 89 and vertical rod 96 downwardly a sufficient distance whereby the upper end of the slotted portion 95ᵃ of the rod 96 contacts with the pin 97, the rock arm 99 will not operate to move the pawl 100 over the ratchet teeth. Should, however, a sufficient number of the labels have been taken up, the downward pressure of a passing can on the member 89 and rod 96 is sufficient to rock the arm 99 and cause the dog 100 to travel over one tooth of the ratchet wheel 102. The dog being in engagement with a succeeding tooth, an upward movement of the opposite end of the rock arm 99, by means to be hereinafter described, will move the ratchet wheel and associated parts, whereby to slightly elevate the label bed.

A suitable tension spring 103ᵃ is provided for the rock arm 99, said spring being secured to the latter at one end and at its opposite end to a support 104, the latter connection permitting of adjustment, as desired.

The means for positively actuating the rock arm 99 whereby the dog 100 moves the ratchet wheel, the said dog 100 having previously been moved into engagement with a succeeding tooth by the can pressure on the member 89, and associated parts, will now be described.

A bevel gear 114 is provided, the same having a hub rigidly mounted on the shaft 18ᵃ. 115 is vertically extending shaft suitably supported as by brackets 116 and 116ᵃ, from an adjacent fixed part of the machine, the said shaft having fixed thereon a bevel gear 117, in mesh with the gear 114, whereby the shaft 115 is rotated. Adjacent the lower end of the shaft 115 is a bevel gear 118, adapted to mesh with a similar gear 119, mounted upon a horizontal transverse shaft 119ᵃ having at its inner end a bevel gear 119ᵇ in mesh with a bevel gear 119ᶜ upon a longitudinally extending downwardly inclined shaft 120. Said shaft 120 has at its opposite end a bevel gear 121, adapted to mesh with a similar gear 122, mounted upon a transverse shaft 123, whereby to impart rotary movement to the latter. Positioned upon the shaft 123 is a cam member 124, adapted, in the rotary movement of the shaft 123, to contact with the roller bearing 125, at the end of the rocker arm 99, and tends to elevate this end of the rocker arm, and lower the opposite end, with the result that the pawl 100, at this end of the arm, moves the ratchet wheel in the manner previously described. In this connection it should not be overlooked that the rotary movement of the cam will not tend to actuate the pawl 100 until the roller end of the rock arm has been lowered by the can presser member. The presser member 89 is normally held in its upper position in the path of the cans by the spring 103ᵃ, which supports the rocker arm and connected bar 96, in position.

The rod 96, as shown, is lengthwise yieldable, a spring 126ᵃ being employed to prevent breakage of the parts or injury to the package being labeled under any undue pressure. The spring 126ᵃ is attached to the pintle 126ᵇ at the lower end of the rod 96, and at its opposite end to the pintle 97 on the rocker arm 99, the tension of the spring normally maintaining the pintle 97 and the lower end of the slotted way of the bar 96 in contact.

After the supply of labels is exhausted, and it is desired to lower the label follower 76, the dogs 100 and 103 may be released through the medium of a double arm trip device sleeved upon the shaft 87, one arm 105 of said device having a pin 106 to engage under the dog 103, and the other arm 107 having a pin 108 to engage under the dog 100. The arm 107 is also provided with an operating handle 109 whereby to impart rocking movement to the arms and in said rocking movement, in one direction, to lift the pawls out of operative contact with the ratchet wheel 101. The arm 105 is also provided with means for limiting its movement in opposite directions, comprising a bifurcated terminal 110, to engage over a lug or projection, on the support 75. A spring 112 connecting with the arm 105, at one end at its opposite end with the support 75, tends to normally hold the pins 106 and 109 out of contact with the pawls 100 and 103, respectively. When the said pawls have been released from operative engagement with the ratchet wheel 101, as just described, the operator may impart rotary movement to the ratchet wheel through the medium of the hand wheel 88, and thereby lower the label bed into a position to receive a new supply of labels.

A suitable compensating spring 88ª may be provided, the same being mounted on the shaft 87 and secured at one end to the hand wheel 88, and at its opposite end to a fixed part of the machine. As the shaft 87 is moved in one direction to lower the label bed, the spring is put under tension, and when moved in an opposite direction to raise the label bed the tension is gradually relieved.

Novel means for confining the labels within the receptacle, while at the same time to permit of the uppermost labels to be readily detached from the supply, one at a time by the engagement of the cans therewith, in rolling along the runway, is preferably constructed as follows:—

Eccentrically mounted upon the shaft 123 is a rod 127, pivotally connected at its upper end to a rock arm 128, positioned on a rock shaft 129, extending transversely of the machine and mounted in suitable bearings of the label framework 73. The rock shaft 129 has operatively connected thereto, in a manner to be now described, a pair of knife blades 130, which extend into the label receptacle at opposite sides near the forward end thereof, whereby to engage the margin of the uppermost labels at their edges. The operative connection between the rock shaft and the respective knife blades is similar and a description of one of said connections will suffice for both. Projecting in a direction opposite to the arm 128, and fixed upon the rock shaft 129, is an arm 131, pivotally connected to a vertically extending arm 132, pivoted at the free end of a horizontally disposed arm 133. The arm 133 has an apertured boss 134, to support a knife shank or support 135, which shank has a rocking bearing in ears 136, and at its inner edge is slotted so as to receive the knife blade 130. The knife shank is held in fixed relation to the boss 134, as by a set screw 137. The action of the knife blades is a slight rocking one, and by reason of the fact that the same are positively driven, the continuous rocking action is positive in operation, and it is found, in practice, that the blades in their movement will readily cut through the edge of the uppermost label.

The particular construction of knives and actuating means is of especial merit for its intended use, insuring a neat cut of the labels without the likelihood of tearing or otherwise injuring the same.

Adjacent the rear end of the label receptacle are suitable knife blades 138, which latter are mounted upon the bell crank levers 139, sleeved upon a stud shaft 140, on a suitable bracket positioned on the sides 64 of the label receptacle, a spring member 141 being connected to one arm of the bell crank 139 and at its opposite end to a pin 142, tending to normally exert a slight downward pressure of the knife blades upon the uppermost label. The pin 142 is lengthwise adjustable in a suitably supported bracket 143, on the side of the label receptacle, whereby to regulate the tension of the spring. When properly adjusted, the pin may be held in place through the medium of a set screw or the like 144.

A curling bar 145 extends transversely across the label receptacle, and has a flattened under surface to engage the upper surface of the labels adjacent the rear end of the latter, and constitute a curling means for said labels. The curling bar 145 is mounted at its ends upon bell cranks 146, sleeved at 147, upon the stub shaft 140, a suitable spring member 148, being connected at one end to the opposite arm of the bell crank 146, and at its opposite end to a pin 149, having an adjustable connection with a support 150. Said pin is adapted to be held in adjusted positions, as by a set screw 151, it being understood that the tension of the spring and thereby the pressing contact of the curling bar upon the labels may be regulated at will.

Novel means for interrupting the movement of the cans as the supply of the labels in the label receptacle is exhausted will now be described.

152 is a suitable stop bar preferably of rectangular cross section, adapted to be projected upwardly to a point between the runway bars and in the path of the incoming cans to thereby interrupt the feeding movement thereof. The bar 152 passes through an apertured supporting bracket 153, and has positioned thereon a collar 154, adapted to constitute an abutment for one end of a spiral spring 155, sleeved upon the bar 152 and engaging at its opposite end the bracket support 153. The action of the spring 155 is to exert upward pressure on the bar 152 so as to position the same in the path of the cans, as just described. It is understood, of course, that the normal position of the bar 152 is below the runway and the same is adapted to be held in lowered position through means, substantially as follows:—

A retaining rod 156 is pivoted at its rear end to a rock arm 157, pivoted at 158, to the T-shaped support 75, said rock arm having an offset part 159 projecting into the T-shaped support, and in the path of a laterally projecting pin 160, upon the rack bar 82. A spring member 161 positioned on the bar 156 and connected thereto at one end and engaging at its opposite end a guide 162 for the rod 156, tends to force the rod forwardly or in position to engage within a recess 163, on the stop bar 152, a hand engaging member 164 being provided at the lower end of said stop bar 152 whereby to draw the same downwardly against the action of the spring 155, to the end that the rod 156 may engage in said recess 163, and thereby retain the stop bar 152 in lowered position. When the parts are in this position, it will be observed that the offset part 159 is in the direct path of the actuating pin 160, of the rack bar 82, with the result that when the rack bar is in elevated position at a time when the supply of labels is about exhausted, the pin 160 will contact with the offset member 159, thereby rocking arm 157, and drawing the rod 156 rearwardly or out of engagement with the stop bar 152, when the latter, under the action of the spring 155, will elevate and thereby stop the feeding movement of the cans. The rod 156 is lengthwise adjustable as indicated 156ᵃ whereby to more accurately time the operation of the can stop 152.

The lap end pasting mechanism is preferably constructed substantially as follows:— 165 is a suitable paste receptacle, the same being adjustably supported in any desired manner upon the framework of the machine adjacent the rear end of the label receptacle. A shaft 166 is mounted in suitable bearings in the receptacle, said shaft projecting through opposite sides of the receptacle and having mounted thereon a suitable hand wheel 167 for manual operation, as desired. Said shaft also has a pivotal connection 168 with a sleeve 169 lengthwise adjustable upon the rod 170 and rotatably mounted upon the latter. The rod 170 has at its outer end a suitable bevel gear 171, adapted to mesh with a similar gear 172, mounted upon the vertically extending shaft 115. Keyed upon the shaft 166, at a point without the paste receptacle 165, is a suitable gear wheel 173, adapted to mesh with a gear wheel 174, positioned on a shaft 175, which said shaft is mounted upon a rock sleeve 176, pivoted at 177 to the outside of the paste receptacle, a spring member 178 engaging said rock sleeve 176, tending to normally retain the gear wheels in mesh. Also fixed upon the shaft 166, at a point within the paste receptacle 165 is a suitable wheel 179, and fixed upon the shaft 175 is a suitable positively driven wheel 180, the said wheels being adapted to contact with one another and the wheel 180 having side flanges to overlie the side edges of the coöperating wheel 179. An elongated belt supporting bar 181 projects from side to side of the label receptacle, at a point adjacent the lap end of the label, said bar being adjustably mounted upon a support 182, projecting from the receptacle 165, as by a pin and slot engagement 183. Adjacent the free end of the bar 181 are grooved rollers 184 and 185, respectively, and positioned upon the support 182 is a grooved roller 186, as well as a roller 187, which latter preferably has a smooth periphery. 188, is an endless paste carrier adapted at one end to pass around the roller 179 and at its opposite end to pass around the roller 185. The lower stretch of the belt rests upon the rollers 184, 186, and 180, whereas the spacing roller 187 is interposed between opposite stretches of the belt. A suitable paste scraper 185ᵃ may be interposed between the rollers 184 and 185 as illustrated.

It is desirable to regulate the quantity of paste taken up from the receptacle by the endless paste carrier 188, and with this end in view, a suitable scraper member 189 is provided, the same being slidably mounted in suitable guide ways 190, and adapted to engage over the paste upon the upper stretch of the belt. A spring member 191 secured to an offset part 192 of the scraper 189 tends to exert inward pressure on said scraper or into a position against the paste on the carrier 188. The inward movement of the scraper member 189 is limited by an adjustable screw member 193, adapted at its inner end to contact with a wall 194 of the paste receptacle, and when properly adjusted the screw is held in position as by a lock nut 195.

It is also desirable to prevent smearing of the edges of the labels as the paste belt 188 moves into contact therewith, and to this end, a suitable paste guard 196 is provided, the same having a downwardly projecting flange 197, to contact with the side of the label receptacle; a shoulder 198 to engage the edge of the labels; a transversely extending portion 199 to overlie the upper portion of the label adjacent said edge, and an elongated corrugated edge finger 200, to overlie the edge of the paste belt. The opposite edge of the member 196 has a side flange 201, to overlie the opposite edge of the paste applying belt and connected to a forward projection of said edge 201 is a transversely extending corrugated surface 202, adapted to overlie the lower stretch of the belt.

It is desirable, of course, to permit of the adjustment of the paste guard according to the size of the labels, and with this in view, the member 196 is pivoted at 203 to an elongated rod 204 passing through suitable offset eyes 205, in a pivoted support 206, at the outer end of the bar 181. Positioned upon said rod 204, at a point between the eyes 205 is a suitable abutment 207, adapted to be secured to the rod 204, as by a thumb bolt 208. Interposed between the abutment 207 and the offset eye 205 is a suitable spiral spring 209, the action of which spring is to force the rod 204 inwardly so as to properly position the guard 196, with respect to the edge of the labels. The inward movement of the rod 204 is limited by the shoulder 198 contacting with the side of the label receptacle. It will be appreciated from the above that the guard 196 may be readily adjusted whereby to engage variable widths of labels by simply loosening the thumb screw 208, when the rod may be slid upon the bracket 206 and it will also be appreciated that regardless of the position of the rod the tension of the spring 209 will remain the same.

It is very desirable, when the label supply becomes exhausted, to positively interrupt the upward feeding movement of the label bed or follower in view of the fact that the continued upward movement would result in damage to the label retaining device such as the knives which project over the edges of the labels. This continued upward movement would also tend to strip the teeth from the ratchet wheel 101. In order to provide against these possibilities, the ratchet wheel 101 is preferably provided with a projection 213, adapted, in the rotary movement thereof, to contact with a projection 214 on the rock arm 99, thereby interrupting the movement of the ratchet wheel, and in turn, of course, interrupting the feeding movement of the rack bar, connected to the label follower. The parts are so timed that the projection 213 of the ratchet wheel contacts with the projection 214 of the rock arm at a time when the label supply is substantially exhausted.

The means for affixing the labels and ironing the same upon the cans includes a suitable yieldable bed, as of felt, at the rear end of the runway, the action of the feed belt tending to exert pressure on the labeled can to smooth out any wrinkles and firmly affix the labels to the cans.

In order to accurately guide the cans in their movement along the runway there is preferably provided at one side of the runway a relatively fixed guide member 210, to engage one end of the cans, and a thin yieldable sheet metal strip 211, to engage the opposite end of the cans. The yieldable metallic strip 211 has a flat surface to engage the cans and is preferably of a single piece, throughout, whereby it is highly yieldable upon itself at any point throughout the length of the runway to thereby accommodate cans of irregular lengths. Spiral spring supports 212 may be provided at suitable intervals throughout the length of the yieldable sheet metal guide 211.

The general operation of the machine may be briefly reviewed as follows:—

It being understood that the can chutes 12—13 are in elevated position, the same are delivered to the feed chute 12 when they pass into operative association with the spacing mechanism, to the end that the cans are fed along the runway in spaced relation one with another. As the cans move into contact with the paste applying disks 44, a series of daubs of paste will be applied to the cans, said series extending from end to end of the cans. The cans then roll into contact with one end of the labels, the paste on the cans picking up the label and in the rotation of the cans applying the label thereto, it being understood in this connection that the movable retaining knife blades of the label receptacle at the proper time operate to release the uppermost label and the label having received a proper curl due to the action of the curling bar 145, whereby the label readily conforms to the can. In the meantime, the lap end of the label has received a supply of paste through the medium of the paste carrier 188. The continued movement of the cans due to the action of the endless carriers will serve to iron or press the labels about the circumference of the can when brought into contact with the bed at the rear end of the machine.

In the description and claims, for purpose of convenience, the term "can" or "cans" is usually employed to refer to the article to be labeled, but in this connection it is to be understood, of course, that this term is employed as a general one, embracing any article or package for which the various improvements may be adapted.

What we claim is:—

1. In a labeling machine, longitudinally extending supporting bars, labeling mechanism, a paste receptacle, a pasting device within the receptacle, said receptacle having a bracket at opposite sides thereof adapted to loosely engage over said bars, whereby the receptacle may be adjusted longitudinally, and means for retaining said receptacle in adjusted positions.

2. In a labeling machine, a runway for cans or the like, means for applying paste to the periphery of the cans, a label support in the path of the cans rearwardly of said paste applying means, endless carriers arranged above the runway and adapted to impart rotatable movement to the cans along the runway, said carriers being laterally spaced from one another and adapted to project beyond opposite ends of the cans, means for imparting movement to said carriers, and means to engage the lower stretch of the carriers whereby to tilt the same and maintain contact thereof with the edges only of the cans, said last mentioned means comprising a rotatable shaft projecting transversely of the runway, and rollers mounted on the shaft one for each carrier, said rollers having a tapered periphery with the enlarged end thereof arranged at a point beyond the end of the can and the smaller end thereof projecting inwardly to overlie the periphery of the can, and an annular abutment for the inner edge of said carriers.

3. In a labeling machine, the combination of an elongated runway for cans or the like, means for applying paste to the periphery of the cans as fed along the runway, labeling instrumentalities arranged rearwardly of said paste applying means, oppositely disposed feed belts arranged above the runway for imparting rotatable movement to the cans along the runway, and means interposed between opposite stretches of the belts so as to engage the lower stretch thereof and contact the same with the edges only of the cans, said means including tapered roller bearings, the enlarged portion thereof being disposed outwardly beyond the edges of the cans and the reduced portion thereof being disposed inwardly of the ends of the cans, and disk-shaped abutments spaced inwardly from the reduced end of the rollers to engage the inner edges of the belt, and means for exerting spring pressure on said rollers.

4. In a labeling machine, can supporting bars, labeling instrumentalities, a paste roll to engage the cans, a paste receptacle for supporting the roll, a loose support between the receptacle and bars for one end of the receptacle, whereby the same may be adjusted lengthwise of the bars, means for tilting the opposite end of the receptacle about said supporting connection as a fulcrum, and means for retaining the receptacle in adjusted positions.

5. In a labeling machine, a can runway, labeling mechanism, a paste receptacle having a side extension at its rear end projecting beyond the side of the runway, a shaft having a bearing in the sides of the receptacle adjacent the forward end, upwardly projecting brackets on the receptacle adjacent the rear end thereof engaging over the top of the runway, a paste roll mounted on said shaft and comprising a series of disks projecting above the top of the receptacle, a cover for the receptacle at the reduced forward end thereof, having a cut out part for the reception of the paste roll, and a scraper member having a series of scraper teeth projecting into the space between the disks, and means for adjustably mounting the scraper member in place.

6. In a labeling machine, a can runway, labeling mechanism, a paste receptacle having a side extension at its rear end projecting beyond the sides of the runway, a shaft having a bearing in the sides of the receptacle adjacent the forward end, supporting brackets on the receptacle having cut-out parts to receive opposite edges of the runway, means for feeding the cans along the runway and over said paste receptacle, a paste roll mounted on the shaft in said receptacle, a cover for the receptacle at the reduced forward end thereof, said shaft projecting outwardly beyond one side of the receptacle, a gear on said shaft in the space to the front of the side projection of the receptacle, and a driving connection with said gear operatively associated with the can feeding means.

7. In a labeling machine, a can runway, labeling mechanism, a paste receptacle having a side extension at its rear end projecting beyond the side of the runway, a shaft having a bearing in the sides of the receptacle adjacent the forward end, a paste roll in said shaft, a loose support between the receptacle and runway for the rear end of the receptacle, an auxiliary support for the forward end of the receptacle, said auxiliary support being adjustable longitudinally of the machine whereby to adjust the receptacle longitudinally, and a vertically adjustable connection between said auxiliary support and the forward end of the receptacle whereby the latter may be elevated or lowered with respect to the loosely supported rear end thereof.

8. In a labeling machine, a runway for cans or the like, means for applying paste to the periphery of the cans, labeling mechanism, a feed belt arranged above the runway, driving means for the latter, and guiding rollers interposed between opposite stretches of the belt to engage the lower stretch thereof so as to contact the latter with the edges only of the pasted can, said rollers having a conical periphery, yieldably supported transversely extending shafts for the rollers, and a disk-shaped projection on the shafts spaced from the inner end of the rollers and of greater diameter than the rollers at said inner end.

9. In a labeling machine, a runway for cans or the like, means for applying paste to the periphery of the cans, labeling mechanism, a feed belt arranged above the runway, driving means for the latter, and guiding rollers interposed between opposite stretches of the belt to engage the lower stretch thereof so as to contact the latter with the edges only of the pasted can, said rollers having a conical periphery, yieldably supported transversely extending shafts for the rollers, and a disk-shaped projection on the shafts spaced from the inner end of the rollers and of greater diameter than the rollers at said inner end, and auxiliary spring pressed guiding rollers to engage the inner surface of the lower stretch of the belt, the auxiliary rollers being of substantially the same diameter from edge to edge.

10. In a labeling machine, a can runway, pasting mechanism and a label receptacle in the path of the cans as moved along the runway, said receptacle comprising oppositely disposed sides laterally adjustable relative to one another to accommodate labels of different sizes, and a platform interposed between said sides and comprising two longitudinally extending sections, an intermediate support disposed below the platform, a slidable connection between said support and the platform sections, lugs depending from said sections substantially midway of the ends of the latter, and centrally disposed springs interposed between said lugs and said support whereby to normally exert outward pressure on the platform sections to contact the same with the sides of the receptacle regardless of the adjustment of the latter.

11. In a labeling machine, a can runway, and label supporting means intermediate the ends of the runway including oppositely disposed sides, transversely extending rod supports adjacent opposite ends of said sides, a sleeved engagement between the sides and rods, whereby the sides may be laterally adjusted relative to one another, means for retaining said sides in adjusted positions, and a vertically movable label bed positioned between the sides, the bed having laterally adjustable sections.

12. In a labeling machine, a can runway, a label support, and means for moving the latter vertically, comprising a rack bar operatively connected to the label bed, gear teeth to engage said bar, means for actuating the latter, and controlling means for the actuating means including a vertically movable rod operatively connected to the actuating means, a can engaging presser member, and an adjustable connection between the presser member and rod.

13. In a labeling machine, a can runway, a label support, and means for moving the latter vertically, comprising a rack bar operatively connected to the label bed, gear teeth to engage said bar, and means for actuating the latter including a rock arm having a pawl, a vertically movable rod operatively connected to the rock arm, an arm pivotally connected at one end to a fixed support and at its opposite end to the rod, and a can engaging presser member connected to said pivoted arm.

14. In a labeling machine, a can runway, a label support, and means for moving the latter vertically, comprising a rack bar operatively connected to the label bed, gear teeth to engage said bar, and means for actuating the latter including a rock arm having a pawl, a vertically movable rod operatively connected to the rock arm, an arm pivotally connected at one end to a fixed support adjacent the runway, and at its opposite end to the rod, and a can engaging presser member adjustably connected to said pivoted arm.

15. In a labeling machine, a can runway, a label support, and means for moving the latter vertically comprising a rack bar operatively connected to the label bed, gear teeth to engage said bar, and means for actuating the latter, and controlling means for the actuating means including a vertically movable rod operatively connected to the actuating means, a substantially horizontally disposed arm pivotally connected at one end to a fixed support and at its opposite end to the rod, a can engaging presser member connected to said pivoted arm having a projection arranged in the path of the cans to be actuated thereby, said presser member having a segmental slot, and a securing pin passing through the slot and engaging the pivoted arm, whereby the presser member may be adjusted.

16. In a labeling machine, a can runway, a label support, and means for moving the latter vertically comprising a rack bar operatively connected to the label bed, gear teeth to engage said bar, means for actuating the latter, and controlling means for the actuating means, including a vertically movable rod operatively connected to the actuating means, a can engaging presser member, an adjustable connection between the presser member and rod, and said rod being adapted to yield upon itself under excess pressure.

17. In a labeling machine, a can runway, a label support, and means for moving the latter vertically, comprising a rack bar, means for actuating the latter, and controlling means for the actuating means, including a vertically movable rod operatively connected to the actuating means, an arm pivotally connected at one end to a fixed support and at its opposite end to the rod, a can engaging presser member connected to said pivoted arm, and a tail-piece on said pivoted arm to engage a fixed stop to limit the movement of the presser member.

18. In a labeling machine, a can runway, a label support, and means for moving the latter vertically comprising a rack bar operatively connected to the label bed, gear teeth to engage the rack bar, a ratchet wheel operatively connected with the gear teeth, and means for imparting rotary movement to the ratchet, including a rock arm having a pawl to engage the ratchet teeth, means for actuating the rock arm, and controlling means for the last mentioned means including a vertically extending rod operatively connected at the lower end to the rock arm, a can engaging presser member, and an adjustable connection between the last mentioned member and rod.

19. In a labeling machine, a can runway, a label support, and means for moving the latter vertically comprising a rock bar operatively connected to the label bed, gear teeth to engage the rack bar, a ratchet wheel operatively connected with the gear teeth, and means for imparting rotary movement to the ratchet, including a rock arm having a pawl to engage the ratchet teeth, means for actuating the rock arm, and controlling means for the last mentioned means including a vertically extending rod loosely connected at the lower end to the rock arm, a can engaging presser member, and an adjustable connection between the last mentioned member and rod, and said vertically movable rod being yieldable upon itself under excess pressure.

20. In a labeling machine, a can runway, a label support, and means for moving the latter vertically comprising a rack bar operatively connected to the label bed, gear teeth to engage the rack bar, a ratchet wheel operatively connected with the gear teeth, and means for imparting rotary movement to the ratchet, including a rock arm having a pawl to engage the ratchet teeth, means for actuating the rock arm, and controlling means for the last mentioned means including a vertically extending rod operatively connected at its lower end to said rock arm, a can engaging presser member, a connection between said last mentioned member and the vertically movable rod, and means for limiting the upward movement of the presser member.

21. In a labeling machine, a can runway, a label support, and means for moving the latter vertically comprising a rack bar operatively connected to the label bed, gear teeth to engage the rack bar, a ratchet wheel operatively connected with the gear teeth, and means for imparting rotary movement to the ratchet including a rock arm having a pawl to engage the ratchet teeth, means for actuating the rock arm, and controlling means for the last mentioned means including a vertically movable extending rod, said vertically movable rod having a movable connection at its lower end with the rock arm, a can engaging presser member, and a connection between the last mentioned member and the vertically movable rod.

22. In a labeling machine, a can runway, a label support and means for moving the latter vertically comprising a rack bar operatively connected to the support, a gear wheel engaging the bar, and means for actuating the latter including a ratchet wheel, a rock arm having a pawl to engage the ratchet wheel, and an adjustable connection between the pawl and rock arm.

23. In a labeling machine, a can runway, a label support, and means for moving the latter vertically comprising a rack bar operatively connected to the label bed, gear teeth to engage the rack bar, a ratchet wheel operatively connected with the gear teeth, and means for imparting rotary movement to the ratchet, including a rock arm having a pawl to engage the ratchet teeth, means for actuating the rock arm and controlling means for the latter including a vertically extending rod, a connection between the vertically movable rod and rock arm, said connection including a pin on one of said parts to engage a slotted portion of the other, a can engaging presser member, and an operative connection between said presser member and vertically movable rod.

24. In a labeling machine, a can runway, a label support, and means for moving the latter vertically comprising a rack bar operatively connected to the label bed, gear teeth to engage the rack bar, a ratchet wheel operatively connected with the gear teeth, and means for imparting rotary movement to the ratchet including a rock arm having a pawl to engage the ratchet teeth, means for actuating the rock arm and controlling means for the latter including a vertically extending rod connected at the lower end of the rock arm, a can engaging presser member, an adjustable connection between the last mentioned member and rod, and a tension spring for the rock arm.

25. In a labeling machine, a can runway, a label support, and means for moving the latter vertically, comprising a rack bar operatively connected to the label support, gear teeth to engage the rack bar, a ratchet wheel operatively connected with the gear teeth, a rock arm having a pawl to engage the ratchet teeth, means for actuating the rock arm, a holding pawl to engage the ratchet teeth, and means for holding said pawls out of operative engagement with the ratchet teeth comprising a rock member having parts to engage said pawls, and means for limiting the movement of said last mentioned rock member.

26. In a labeling machine, a can runway, a label support, and means for moving the latter vertically, comprising a rack bar operatively connected to the label support, gear teeth to engage the rack bar, a ratchet wheel operatively connected with the gear teeth, a rock arm having a pawl to engage the ratchet teeth, means for actuating the latter, a holding pawl to engage the ratchet teeth, and means for holding said pawls out of operative engagement with the ratchet teeth comprising a rock member having parts to engage said pawls, means for limiting the movement of said last mentioned rock member, including a forked extension on said member and a fixed lug to engage between the arms of the forked extension.

27. In a labeling machine, the combination of a can runway, pasting means, a label support, said label support having a connected rack bar projecting downwardly therefrom, movable teeth to engage said rack bar, a ratchet wheel connected to said teeth, a rock arm having a pawl to engage the teeth of the ratchet wheel, means for actuating the rock arm, a spring holding pawl to engage the teeth of the ratchet wheel, and means for simultaneously moving said pawls out of operative engagement with the teeth of the ratchet wheel including a rock member having parts to engage said pawls, hand engaging means for the rock member, and means for limiting the movement of said rock member, including a forked extension on said member and a fixed lug to engage between the arms of the forked extension.

28. In a labeling machine, the combination of a can runway, pasting means, a label support, said label support having a connected rack bar projecting downwardly therefrom, movable teeth to engage said rack bar, a ratchet wheel connected to said teeth, a rock arm having a pawl to engage the teeth of the ratchet wheel, actuating means for the rock arm, a spring pressed holding pawl to engage the teeth of the ratchet wheel, and means for simultaneously moving said pawls out of operative engagement with the teeth of the ratchet wheel including a rock member having parts to engage said pawls, hand engaging means for the rock member, and means for limiting the movement of said rock member including a forked extension on said member, a fixed lug to engage between the arms of the forked extension, and spring means for normally holding said rock member in one of its limits of movement.

29. In a labeling machine, a can runway, a label support, and means for moving the latter vertically comprising a rack bar operatively connected to the label bed, gear teeth to engage said bar, and means for actuating the latter including a rock arm, means independent of and adapted to actuate said arm, and controlling means for the latter including a movable rod operatively connected to the rock arm, and a can engaging presser member for the rod.

30. In a labeling machine, a can runway, a label support, and means for moving the latter vertically comprising a rack bar operatively connected to the label bed, gear teeth to engage said bar, and means for actuating the latter, a movable label retaining member to engage the uppermost label, and means operatively associated with the last mentioned means to move said label support.

31. In a labeling machine, a can runway, pasting mechanism, a label bed adapted to support a supply of labels, whereby the moving cans move upon the label supply, means for imparting vertical movement to the label bed, a trip member adapted to be engaged by a moving can, said trip member occupying a predetermined position relative to the normal height of the labels, and operating to render operative said means for imparting vertical movement to the bed, only after a plurality of labels have been taken from the supply.

32. In a labeling machine, the combination of a runway for cans and the like, pasting mechanism, a label receptacle, a label follower, a presser member adjacent the top of the receptacle, said presser member being adapted to be moved by a can, and the downward pressing movement of the can on the presser member being limited by the vertical plane of the label supply with which the can engages, and means operatively associated with the presser member to elevate the bed only after the diminished supply of labels permits the can to lower the presser member a predetermined distance.

33. In a labeling machine, a can runway, a label support, and means for moving the latter vertically comprising a rack bar operatively connected to the label bed, gear teeth to engage the rack bar, a ratchet wheel operatively connected with the gear teeth, and means for imparting rotary movement to the latter, including a rock arm having a pawl to engage the ratchet teeth, means to engage the rock arm to cause the same to move the ratchet wheel, and controlling means for the last mentioned means including a vertically extending rod connected at its lower end to the rock arm, a can engaging presser member, and connection between the can engaging presser member and rod.

34. In a labeling machine, the combination of a runway for cans and the like, pasting mechanism, a label receptacle, a label follower, a presser member adjacent the top of the receptacle, said presser member being adapted to be moved by a can, and the downward pressing movement of the can on the presser member being limited by the vertical plane of the label supply with which the can engages, actuating means for the label follower, and operative engagement between said means and trip member whereby said actuating means is rendered operable to raise the follower.

35. In a labeling machine, a runway for cans and the like, pasting mechanism, and labeling mechanism, the latter including a label bed adapted to support a supply of labels whereby a moving can will engage and pick up the topmost label, elevating means for the label bed, and governing means for the elevating means, said governing means being controlled by the can pressure thereon permitted by the position of the label supply over which the cans move.

36. In a labeling machine, a runway, a label bed, or follower, a rack bar, gear teeth to impart movement thereto, a ratchet wheel operatively associated with the gear teeth, a rock arm having at one end a pawl to engage the ratchet teeth, a vertically extending rod connected to the opposite end of said rock arm, and having a can presser member at the upper end thereof, and means movable to engage said rock arm to positively actuate the same.

37. In a labeling machine, a runway, a label bed, or follower, a rack bar, gear teeth to impart movement thereto, a ratchet wheel operatively associated with the gear teeth, a rock arm having at one end a pawl to engage the ratchet teeth, a vertically extending rod connected to the opposite end of said rock arm, and having a can presser member at the upper end thereof, movable means to engage said rock arm to move the same, knife blades to engage over the upper surface of the uppermost label, and means operatively associated with the last mentioned movable means to periodically move said knife blades.

38. In a labeling machine, a runway, a label bed, or follower, a rack bar, gear teeth to impart movement thereto, a ratchet wheel operatively associated with the gear teeth, a rock arm having at one end a pawl to engage the ratchet teeth, a vertically extending rod connected to the opposite end of said rock arm, and having a can presser member at the upper end thereof, said rod acting to position said rock arm, and cam means to engage said rock arm after being positioned to move the same.

39. In a labeling machine, a runway, a label bed or follower, a rack bar, gear teeth to impart movement thereto, a ratchet wheel operatively associated with the gear teeth, a rock arm having at one end a pawl to engage the ratchet teeth, a vertically extending rod connected to the opposite end of said rock arm and having a can presser member at the upper end thereof, whereby to position the rock arm, and a lower driven cam to automatically engage said rock arm, and actuate the same.

40. In a labeling machine, a runway, a label bed or follower, a rack bar, gear teeth to impart movement thereto, a ratchet wheel operatively associated with the gear teeth, a rock arm having at one end a pawl to engage the ratchet wheel, a vertically extending rod connected to the opposite end of said rock arm and having a can presser member at the upper end thereof, and a power driven cam to engage said rock arm to actuate the same, a shaft for said cam, movable knife blades to engage the labels, and a driving connection between said shaft and knife blades.

41. In a labeling machine, a runway, a label bed or follower, a rack bar, gear teeth to impart movement thereto, a ratchet wheel operatively associated with the gear teeth, a rock arm having at one end a pawl to engage the ratchet teeth, a vertically extending rod connected to the opposite end of said rock arm, and having a can presser member at the upper end thereof, and movable means to engage said rock arm to actuate the same in one direction, means for feeding the cans along the runway, and means operatively associated with the can feeding means for imparting movement to the last mentioned movable means.

42. In a labeling machine, the combination of a label support, movable knife blades to engage the topmost labels, a rack bar projecting downwardly from the label support, a ratchet wheel having connected thereto teeth to engage the rack bar, a rock arm having a dog to engage the teeth of the ratchet wheel, means for moving the rock arm in one direction, whereby the dog will move over the teeth of the ratchet wheel, means to move the rock arm in an opposite direction whereby to impart rotary movement to the ratchet wheel, and means operatively associated with the last mentioned means for actuating the movable knife blades.

43. In a labeling machine, the combination of a label support, movable knife blades to engage the topmost labels, a rack bar projecting downwardly from the label support, a ratchet wheel having connected thereto teeth to engage the rack bar, a rock arm having a dog to engage the teeth of the ratchet wheel, means for moving the rock arm in one direction, whereby the dog will move over the teeth of the ratchet wheel, movable means to move the rock arm in an opposite direction whereby to actuate the ratchet wheel, including a rotatable shaft, a cam on the shaft to engage the rock arm, and means operatively connected with said shaft for imparting movement to the knife blades.

44. In a labeling machine, the combination with a can runway, pasting mechanism, a label support, knife edged label retaining means to engage the topmost label adjacent the edge thereof, means independent of the movement of the cans for positively actuating said label retaining means to release the uppermost label, said means offering substantially no obstruction above the runway.

45. In a labeling machine, the combination of a runway for cans or the like, pasting mechanism, a label support, said mechanism and support being arranged intermediate the ends of the runway, and label retaining means including a knife blade to engage the uppermost label adjacent the edge thereof, means independent of the movement of the cans for positively moving said knife blade in opposite directions so as to cut through and release the uppermost label, said means offering substantially no obstruction beyond the upper surface of the runway.

46. In a labeling machine, the combination of a runway for cans or the like, pasting mechanism, a label support, said mechanism and support being arranged intermediate the ends of the runway and in the path of the cans, and label retaining means including a knife blade to engage the uppermost label adjacent the edge thereof, and power driven means for imparting a cutting movement to said knife blade to cut through and release the uppermost label.

47. In a labeling machine, the combination of a runway for cans or the like, pasting mechanism, a label support, said mechanism and support being arranged intermediate the ends of the runway and in the path of the cans, and label retaining means including a knife blade to engage the uppermost label adjacent the edge thereof, a rocking support for said knife blade, and power driven means for actuating the support.

48. In a labeling machine, the combination of a runway for cans or the like, pasting mechanism, a label support, said mechanism and support being arranged intermediate the ends of the runway and in the path of the cans, and label retaining means including a knife blade to engage the uppermost label adjacent the edge thereof, and a rocking support for the knife blade, a driving shaft, and lever mechanism interposed between said shaft and rocking support.

49. In a labeling machine, the combination of a runway for cans or the like, pasting mechanism, a label support, said mechanism and support being arranged intermediate the ends of the runway and in the path of the cans, and label retaining means including a knife blade to engage the uppermost label adjacent the edge thereof, an adjustable rock support for the knife blade, and positive drive means for moving said support.

50. In a labeling machine, the combination of a runway for cans or the like, pasting mechanism, a label support, said mechanism and support being arranged intermediate the ends of the runway and in the path of the cans, and label retaining means including a knife blade to engage the uppermost label adjacent the edge thereof, a rock shaft support for the knife blade, means independent of the can movement for actuating said rock shaft, said last mentioned means being disposed below the runway.

51. In a labeling machine, the combination of a runway for cans or the like, pasting mechanism, a label support, said mechanism and support being arranged intermediate the ends of the runway and in the path of the cans, and label retaining means including a knife blade to engage the uppermost label adjacent the edge thereof, a rock shaft support for the knife blade, power driven means for actuating said rock shaft, and means for varying the movement of the rock shaft.

52. In a labeling machine, the combination of a runway for cans or the like, pasting mechanism, a label support, said mechanism and support being arranged intermediate the ends of the runway and in the path of the cans, and label retaining means including a knife blade to engage the uppermost label adjacent the edge thereof, a rock shaft support for the knife blade, means for actuating said rock shaft, and an adjustable eccentric bearing for the rock shaft.

53. In a labeling machine, the combination of a runway, pasting mechanism, a label support, said mechanism and support being arranged in the path of the can intermediate the ends of the runway, and label retaining means including knife blades to engage the uppermost label adjacent opposite edges thereof, a rocking support for said blades, a driving shaft, means independent of the movement of the cans for driving said shaft, and connections disposed below the upper surface of the runway between said shaft and rocking supports.

54. In a labeling machine, the combination of a runway, pasting mechanism, a label support, said mechanism and support being arranged in the path of the article to be labeled and intermediate the ends of the runway, and label retaining means including knife blades to engage the uppermost label adjacent opposite edges thereof, a movable support for said knives, a rotatable shaft, power driven means for the shaft, means for rotating the shaft, and connections between said shaft and support.

55. In a labeling machine, the combination of a runway, pasting mechanism, a label support, said mechanism and support being arranged in the path of the can intermediate the ends of the runway, and label retaining means including knife blades to engage the uppermost label adjacent opposite edges thereof, a movable support for said knives, a rotatable shaft, means independent of the movement of the cans for driving said shaft, means for rotating the shaft, and lever connections between said shaft and support, said connections offering substantially no obstruction above the runway.

56. In a labeling machine, the combination of a runway, pasting mechanism, a label support, said mechanism and support being arranged intermediate the ends of the runway, and label retaining means including knife blades to engage the uppermost label adjacent opposite edges thereof, a movable support for each of said knives, a rotatable shaft, means independent of the movement of the articles along the runway for rotating the shaft, connections between said shaft and supports, and means for adjusting the movement of said supports.

57. In a labeling machine, the combination of a runway, pasting mechanism, a label support, said mechanism and support being arranged intermediate the ends of the runway, and label retaining means including knife blades to engage the uppermost label adjacent opposite edges thereof, a rocking support for each of said knives, a driving shaft, connections between said shaft and rocking supports, a belt for feeding the cans along the runway, means for moving the belt and operatively associated means for rotating said shaft.

58. In a labeling machine, the combination of a runway, pasting mechanism, a label support, said mechanism and support being arranged intermediate the ends of the runway and therebelow, and label retaining means including movable knife blades to engage the uppermost label adjacent opposite edges thereof, means for feeding the cans along the runway, including an endless carrier, driving means therefor, and means operatively associated with the last mentioned means to move the knife blades.

59. In a labeling machine, the combination of a runway, pasting mechanism, a label support, said mechanism and support being arranged intermediate the ends of the runway, and label retaining means including knife blades to engage the uppermost label adjacent opposite edges thereof, a rotatable shaft, a rod eccentrically connected to said shaft, a rock shaft, and lever connections between said rock shaft and knife blades for positively moving the latter.

60. In a labeling machine, the combination of a runway, pasting mechanism, a label support, said mechanism and support being arranged intermediate the ends of the runway, and label retaining means including knife blades to engage the uppermost label adjacent opposite edges thereof, a rotatable shaft, a power drive for the shaft, and a driving connection between said shaft and knife blades, said power drive and connection projecting below the runway and offering substantially no obstruction thereabove.

61. In a labeling machine, the combination of a runway, pasting mechanism, a label support, said mechanism and support being arranged intermediate the ends of the runway, and label retaining means including knife blades to engage the uppermost label adjacent opposite edges thereof, a rotatable shaft, a driving connection between said shaft and knife blades, means for elevating the label support, and means operatively associated with said rotatable shaft for moving the last mentioned means.

62. In a labeling machine, the combination of a runway, pasting mechanism, a label support, said mechanism and support being arranged intermediate the ends of the runway, and label retaining means including knife blades to engage the uppermost label adjacent opposite edges thereof, a rotatable shaft, and a driving connection between said shaft and knife blades, means controlled by the movement of the cans along the runway to elevate the label support, and means operatively associated with said shaft for actuating the label bed elevating means.

63. In a labeling machine, the combination of a runway, pasting mechanism, a label support, said mechanism and support being arranged intermediate the ends of the runway, and label retaining means to engage the uppermost label, a rotatable shaft, means independent of the movement of articles along the runway for driving said shaft, and a driving connection between said shaft and said label retaining means whereby to release the uppermost label.

64. In a labeling machine, the combination of a can runway, a label support, said mechanism and support being arranged intermediate the ends of the runway, label retaining means including a knife blade to engage the upper surface of the uppermost label, a bell crank lever pivotally supported at its elbow and connected at one end to the knife blade, a longitudinally extending adjustable bar having an offset part adjacent one end, and a spring connected at one end to the offset part of the bar and at its opposite end to the free end of the bell crank lever.

65. In a labeling machine, the combination of a can runway, a label support, said mechanism and support being arranged intermediate the ends of the runway, label retaining means including a positively driven rocking knife blade to engage the upper surface of the uppermost label at its edge adjacent one end, and a yieldably supported knife blade to engage the edge of the upper surface of said label at the opposite end thereof.

66. In a labeling machine, the combination of a can runway, pasting mechanism, a label support, said mechanism and support being arranged intermediate the ends of the runway, a curling bar extending transversely across the labels to engage the uppermost label, bell crank levers pivoted at their elbows and each connected at one end to the adjacent end of the curling bar, longitudinally extending adjustable bars having an offset part adjacent one end, and a spiral spring connected at one end to the offset part of said bar and at its opposite end to the free end of the bell crank levers.

67. In a labeling machine, the combination of a runway for cans and the like, and paste applying means including a paste receptacle, an endless paste carrier belt adapted to receive paste from the receptacle, a spring pressed scraper on the receptacle to regulate the quantity of paste on the carrier, and means for regulating the tension of the spring pressure.

68. In a labeling machine, the combination of a runway for cans and the like, labeling mechanism, and lap end paste applying means including a paste receptacle, an endless paste carrier, means for imparting movement thereto, a scraper mounted on said receptacle to operatively engage the belt to regulate the supply of paste thereon, spring means to force the scraper in a direction toward the carrier, and a stop to limit the movement of the scraper under the action of the spring means.

69. In a labeling machine, the combination of a runway for cans and the like, labeling mechanism and lap end paste applying means including a paste receptacle, an endless paste carrier, means for imparting movement thereto, a scraper mounted on said receptacle to operatively engage the belt to regulate the supply of paste thereon, spring means to force the scraper in a direction toward the carrier, a stop to limit the movement of the scraper under the action of the spring means, and hand controlled means for adjusting said stop.

70. In a labeling machine, the combination of labeling mechanism, a runway for cans and the like, and lap end pasting mechanism including a paste receptacle, an endless paste carrier to travel over and engage the lap end of a label, and a spring held paste guard to engage over the edge of the uppermost labels.

71. In a labeling machine, the combination of a can runway, a label support, and pasting means including a paste receptacle, an endless paste carrier to travel over and engage the upper surface of the label, a spring held paste guard to engage the edge of the uppermost labels, said guard being adjustable without varying the tension of the spring.

72. In a labeling machine, a can runway or support, a label receptacle, a paste receptacle, a drive wheel in the receptacle, a bracket arm mounted upon the receptacle and extending across the runway above the labels, said bracket arm having adjacent its outer free end a plurality of pulleys and an endless paste carrying member mounted at one end upon the drive wheel and at its outer end upon the outermost pulley on the bracket arm whereby the paste carrying member is rotated, and opposite stretches of the paste carrying member being supported on the auxiliary pulley of the supporting arm, and a spacing roller interposed between opposite stretches of the paste carrying member.

73. In a labeling machine, the combination of a runway or support for cans or the like, a label receptacle, pasting appliances to one side of the receptacle, and pasting appliances adjacent the opposite side of the receptacle adapted to apply paste to the lap ends of the labels, the last mentioned appliances comprising a paste receptacle, a drive wheel within the receptacle, a bracket arm secured to the receptacle and extending over the label support and having a pulley at its free end, and an endless paste carrier mounted upon the drive wheel and pulley whereby to position the paste carrier above the labels, an auxiliary guide pulley mounted upon the receptacle for said paste carrying member arranged in substantial alinement with the pulley upon the bracket arm, and a roller interposed between opposite stretches of the paste carrier adjacent said auxiliary pulley.

74. In a labeling machine, the combination of a can runway or support, a label receptacle, a paste carrying member for the lap ends of the labels, a support for the latter connection at one side of the machine and having a part extending over the label receptacle, and free from connection at its outer end, a paste guard or shoe adjustably connected with said support, and spring means for forcing the guard or shoe into engagement with the edges of the labels.

75. In a labeling machine, the combination of a can runway, a label support, means for applying paste to the upper surface of the uppermost label including a paste receptacle, an endless paste carrier, a support projecting from the receptacle over the labels having supporting pulleys for the endless paste carrier, a paste guard to engage the edges of the labels, said guard having a slidable adjustable connection with said support, and a spring connection between the guard and the support for yieldably pressing the guard against the labels, the tension of said spring being unaffected by the adjustment of the guard relative to the support.

76. In a labeling machine, the combination of a can runway, labeling instrumentalities including a label feed, and means for interrupting the movement of the cans along the runway, including a vertically movable can stop, means for retaining the same in lowered position out of the path of the cans, spring means for exerting upward pressure on said stop when released, and means governed by the movement of the label feed to release said retaining means.

77. In a labeling machine, the combination of a can runway, labeling instrumentalities including a label feed, and means for interrupting the movement of the cans along the runway, including a vertically movable can stop, spring means for forcing said stop upward into the path of the cans, and means for normally retaining said stop in lowered inactive position against the action of the spring, comprising an elongated rod adapted to engage said stop and operatively connected at its opposite end with the label feed, whereby to be actuated by the latter to release the stop.

78. In a labeling machine, the combination of a can runway, labeling instrumentalities including a label feed, and means for interrupting the movement of the cans along the runway, including a vertically movable can stop, spring means for forcing said stop upward into the path of the cans, said stop having a recess adjacent the lower end thereof, and a hand engaging part at said lower end of the stop, and means for normally retaining said stop in lowered inactive position against the action of the spring, comprising an elongated rod adapted to engage said stop and operatively connected at its opposite end with the label feed, whereby to be actuated by the latter to release the stop.

79. In a labeling machine, the combination of a runway for cans and the like, pasting mechanism, a label follower having a rod extension and an abutment carried thereby, a vertically movable can stop having a recess therein, spring means for exerting upward pressure on the stop to interrupt the movement of the cans, means for retaining the stop in lowered position, comprising an elongated rod adapted to engage at one end in said recess of the stop, and means connected to the rod in the path of the abutment on said rod extension of the label follower to actuate said retaining rod and release the can stop.

80. In a labeling machine, the combination of a runway for cans and the like, pasting mechanism, a label follower having a rod extension and an abutment carried thereby, a vertically movable can stop having a recess therein, spring means for exerting upward pressure on the stop to interrupt the movement of the cans, means for retaining the stop in lowered position, comprising an elongated rod adapted to engage at one end in said recess of the stop, a pivoted bell crank lever connected to one end of the retaining rod and having its opposite end arranged in the path of the abutment on the rod extension of the label follower whereby in the movement of the latter the lever is rocked and the retaining rod moved out of engagement with the can stop.

81. In a labeling machine, the combination of a runway for cans and the like, pasting mechanism, a label follower having a rod extension and an abutment carried thereby, a vertically movable can stop having a recess therein, spring means for exerting upward pressure on the stop to interrupt the movement of the cans, means for retaining the stop in lowered position, comprising an elongated rod adapted to engage at one end in said recess of the stop, a pivoted bell crank lever connected to one end of the retaining rod and having its opposite end arranged in the path of the abutment of the rod extension of the label follower whereby in the movement of the latter the lever is rocked and the retaining rod moved out of engagement with the can stop, and spring means for normally holding said retaining rod in contact with the stop.

82. In a labeling machine, the combination of a runway for cans and the like, pasting mechanism, a label follower having a rod extension and an abutment carried thereby, a vertically movable can stop having a recess therein, spring means for exerting upward pressure on the stop to interrupt the movement of the cans, means for retaining the stop in lowered position, comprising an elongated rod adapted to engage at one end in said recess of the stop, a pivoted bell crank lever connected to one end of the retaining rod and having its opposite end arranged in the path of the abutment of the rod extension of the label follower whereby in the movement of the latter the lever is rocked and the retaining rod moved out of engagement with the can stop, spring means for normally holding said retaining rod in contact with the stop, and said stop terminating at its lower end in a hand engaging member.

83. In a labeling machine, a runway for cans and the like, labeling mechanism, pasting mechanism, a frame for said parts, supporting standards adjacent opposite ends of the frame, a brace bar extending between the standards, pivoted chutes adjacent opposite ends of the runway adapted to swing downwardly, pivoted supports for said chutes, means on the standards to engage said supports to maintain the chutes in elevated position, and means mounted on said brace bar to support said pivoted supports when the chutes are in lowered position.

84. In a labeling machine, the combination of a runway for cans and the like, labeling mechanism, pasting mechanism, a frame for said parts, supporting standards adjacent opposite ends of the frame, brace bars extending between the standards and crossing one another at the center, pivoted chutes adjacent opposite ends of the runway adapted to swing downwardly, pivoted bracket bars for said chutes, means on the standards to engage said bracket bars to maintain the chute in elevated position, and means for connecting the brace bars together at their point of crossing, said means including a bolt having an eye extension adapted to support said brace bars when the chutes are in lowered position.

85. In a labeling machine, the combination of a runway for cans and the like, labeling mechanism, pasting mechanism, a frame for said parts, supporting standards adjacent opposite ends of the frame, brace bars extending between the standards and crossing one another at the center, pivoted chutes adjacent opposite ends of the runway adapted to swing downwardly, pivoted bracket bars for said chutes, recessed bosses on the standards adapted to receive the end of said bracket bars to maintain the chutes in elevated position, and means for connecting the brace bars together at their point of crossing, said means including a bolt having an eye extension adapted to support said brace bars when the chutes are in lowered position.

86. In a labeling machine, the combination of labeling mechanism, pasting mechanism, a can runway or support, a frame for said parts, legs or standards for said support, arranged in pairs adjacent opposite ends thereof, diagonally extending brace rods crossing one another and connected to the leg supports, a bolt for connecting said brace bars together, said bolt having an eye-extension, and pivoted chutes adjacent the front and rear ends of the runway having supporting brackets adapted when in lowered position to engage said eye-extension.

87. In a labeling machine, a runway for cans and the like, pasting mechanism, and labeling mechanism, the latter including a label bed adapted to support a supply of labels whereby a moving can will engage and pick up the topmost label, elevating means for the label bed, can engaging presser means for controlling the elevating means, said elevating means being operable to raise the bed only after the can, due to a diminished supply of labels, is permitted to move said presser member a predetermined distance.

88. In a labeling machine, a runway for cans and the like, pasting mechanism, and labeling mechanism, the latter including a label bed adapted to support a supply of labels whereby a moving can will engage and pick up the topmost label, elevating means for the label bed, can engaging presser means for controlling the elevating means, and means governed by the height of the label supply for governing the movement of the can engaging presser means.

89. In a labeling machine, the combination of a runway for cans and the like, a movable label bed or follower, actuating means for elevating the same, driving mechanism for the latter, and can presser means for operatively connecting said means and mechanism, only after a plurality of labels have been taken up by the moving cans.

90. In a labeling machine, the combination of a runway for cans and the like, a movable label bed or follower, actuating means for elevating the same, driving mechanism for the latter, can presser means for operatively connecting said means and mechanism, and means whereby the supply of labels controls the can presser means.

91. In a labeling machine, the combination of a runway for cans and the like, a movable label bed or follower, actuating means for elevating the same, power driven means for the actuating means, and means actuated by a moving can for operatively connecting said actuating means and power driven means.

92. In a labeling machine, the combination of a runway for cans and the like, pasting mechanism, and labeling mechanism including a label bed or follower, a rack bar for the latter, a gear wheel for engaging the bar to move the same vertically, a rotatable shaft for the gear wheel, and a compensating spring mounted on the shaft and adapted in one movement of the shaft to lower the bed to be placed under tension, and to have its tension gradually released by a movement of the shaft in an opposite direction to elevate the label bed.

93. In a labeling machine, a runway for cans and the like, pasting mechanism, and labeling mechanism including a label bed or follower, a rack bar connected therewith, a ratchet wheel, gear teeth connected with the ratchet wheel to engage and move the rack bar, an actuating dog for the ratchet wheel, a holding dog for the ratchet wheel, and a compensating spring operatively associated with the label feed mechanism.

94. In a labeling machine, a runway for cans and the like, pasting mechanism, and labeling mechanism, including a label bed or follower. a rack bar connected therewith, a ratchet wheel, gear teeth connected with the ratchet wheel to engage and move the rack bar, an actuating dog for the ratchet wheel, a holding dog for the ratchet wheel, means for moving the actuating dog to impart movement to the ratchet wheel, and an adjustable connection between said dog and means whereby to vary the feeding movement of the dog.

95. In a labeling machine, a runway for cans and the like, labeling instrumentalities, and means for applying paste to the lap end of the labels including a paste carrier, and a paste guard adapted to engage the edge of the labels, spring means for holding the guard in yieldable engagement with the labels and means on the guard to engage a fixed part of the label support whereby to limit the movement of the guard under the action of said spring means.

96. In a labeling machine, the combination of a can runway, labeling instrumentalities including a label feed, and means for interrupting the movement of the cans along the runway, including a vertically movable can stop, means for retaining the same in lowered position out of the path of the cans, spring means for exerting upward pressure on said stop when released, and means governed by the movement of the label feed to release said retaining means, said last mentioned means being adjustable.

97. In a labeling machine, the combination of a can runway, labeling instrumentalities including a label feed, and means for interrupting the movement of the cans along the runway, including a vertically movable can stop, spring means for forcing said stop upward into the path of the cans, and means for normally retaining said stop in lowered inactive position against the action of the spring, comprising an elongated rod adapted to engage said stop and operatively connected at its opposite end with the label feed, whereby to be actuated by the latter to release the stop, and means whereby said rod may be adjusted.

98. In a labeling machine, a runway for cans and the like, labeling mechanism, and pasting mechanism for the lap end of the label including a paste receptacle, an endless paste carrier member, a support projecting from the receptacle and adapted to overlie the lap end of the labels, roller supporting means on the receptacle for the paste carrier, a roller bearing at the outer end of said elongated support, around which the paste carrier passes, an auxiliary roll adjacent the last mentioned roll at the outer end of the elongated support over which both stretches of the belt pass, and a scraper member interposed between the last mentioned rolls.

99. In a labeling machine, the combination of a runway, pasting mechanism, a label support, means for periodically moving the label support upwardly, including a rotatable ratchet wheel operatively associated with the support, and means for positively interrupting the last mentioned means after the label support reaches a predetermined elevation, including a stop to engage said ratchet wheel.

100. In a labeling machine, the combination of a runway, pasting mechanism, and labeling mechanism including a label bed, a rack bar connected to the label bed, gear teeth to engage the rack bar, means for moving the gear teeth whereby to elevate the rack bar, and means for positively interrupting the last mentioned means when the bed has been elevated to a predetermined point.

101. In a labeling machine, a runway for cans and the like, pasting mechanism adapted to apply paste to the can, and labeling mechanism including a label follower or bed adapted to support the labels in position to be picked up by the pasted can, and power actuated means independent of the movement of the cans for positively elevating the label bed.

102. In a labeling machine, a runway for cans and the like, pasting mechanism adapted to apply paste to the can, and labeling mechanism including a label follower or bed adapted to support the labels in position to be picked up by the pasted can, power actuated means for elevating the label follower or bed, and governing means for the latter.

103. In a labeling machine, a runway for cans and the like, pasting mechanism and labeling mechanism including a label bed or follower arranged intermediate the ends of the runway and therebelow, and means for elevating the latter including a can engaging presser member, a vertically extending bar operatively connected with said member, and operative connections at the lower end of the bar for exerting upward movement to the follower, said connections being adjustable.

104. In a labeling machine, a runway for cans and the like, pasting mechanism, a label bed or follower arranged intermediate the ends of the runway and therebelow, a trip member to be engaged by the cans, a vertically extending rod adjustably connected to said trip member, a ratchet wheel operatively associated with the label bed or follower whereby to elevate the latter, a rock arm having a dog to engage said ratchet wheel, and an adjustable connection between said rock arm and the lower end of said bar.

105. In a labeling machine, the combination of a runway for cans and the like, pasting mechanism and labeling mechanism including a label bed or follower, arranged intermediate the ends of the runway and therebelow, a ratchet wheel operatively associated with the bed or follower, whereby to elevate the latter, a rock arm having a pawl to engage the ratchet wheel, a trip member to be engaged by a passing can, a vertically extending bar operatively connected with the trip member, and a pin on the rock arm engaging through an aperture in the vertically extending bar, said pin having an eccentric support whereby the same may be adjusted.

106. In a labeling machine, the combination of a runway for cans and the like, pasting mechanism and labeling mechanism including a label bed or follower, arranged intermediate the ends of the runway and therebelow, a ratchet wheel operatively associated with the bed or follower, whereby to elevate the latter, a rock arm having a pawl to engage the ratchet wheel, means for moving said rock arm, said pawl having an adjustable eccentric support whereby the same may be adjusted, and a holding pawl to engage the ratchet.

107. In a labeling machine, the combination of a runway for cans and the like, pasting mechanism, and labeling mechanism including a label bed or follower arranged intermediate the ends of the runway and therebelow, said follower having a rack extension, a ratchet wheel having a gear connection with the rack extension, a rock arm having a pawl to engage the teeth of said ratchet wheel, and coöperating means on the arm and ratchet wheel whereby to limit the movement of the ratchet wheel and stop the elevation of the label bed or follower.

In testimony whereof, we have hereunto affixed our signatures, in the presence of two witnesses.

FREDERICK H. KNAPP.
HAYWOOD G. DEWEY.

Witnesses:
H. N. RAMSEY,
CALVIN T. MILANS.